US010521801B2

(12) United States Patent
Pederson

(10) Patent No.: US 10,521,801 B2
(45) Date of Patent: Dec. 31, 2019

(54) CYBER LIFE ELECTRONIC NETWORKING AND COMMERCE OPERATING EXCHANGE

(71) Applicant: Federal Law Enforcement Development Services, Inc., St. Cloud, MN (US)

(72) Inventor: John C. Pederson, Merritt Island, FL (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 15 days.

(21) Appl. No.: 16/030,329

(22) Filed: Jul. 9, 2018

(65) Prior Publication Data

US 2018/0315054 A1 Nov. 1, 2018

Related U.S. Application Data

(63) Continuation of application No. 14/597,648, filed on Jan. 15, 2015, now abandoned.

(60) Provisional application No. 61/927,663, filed on Jan. 15, 2014.

(51) Int. Cl.

| | |
|---|---|
| *G01M 1/38* | (2006.01) |
| *G06Q 30/00* | (2012.01) |
| *G06F 3/01* | (2006.01) |
| *G06F 1/16* | (2006.01) |
| *G06F 3/03* | (2006.01) |
| *H04L 12/28* | (2006.01) |

(52) U.S. Cl.
CPC ............. *G06Q 30/00* (2013.01); *G06F 1/163* (2013.01); *G06F 3/011* (2013.01); *G06F 3/012* (2013.01); *G06F 3/013* (2013.01); *G06F 3/014* (2013.01); *G06F 3/017* (2013.01); *G06F 3/0304* (2013.01); *G06F 3/0325* (2013.01); *H04L 12/282* (2013.01)

(58) Field of Classification Search
CPC ......... G06Q 30/00; G06F 3/013; G06F 3/017; G06F 3/0304; G06F 3/011; G06F 3/012; G06F 3/014; G06F 3/0325; G06F 1/163; H04L 12/282
See application file for complete search history.

(56) References Cited

U.S. PATENT DOCUMENTS

| | | | |
|---|---|---|---|
| 9,654,163 B2 | 5/2017 | Pederson | |
| 2002/0054411 A1 | 5/2002 | Heminger | |
| 2002/0163448 A1* | 11/2002 | Bachinski | B64D 43/02 340/966 |
| 2003/0107748 A1* | 6/2003 | Lee | G06F 3/0325 356/614 |

(Continued)

*Primary Examiner* — Adam Lee
(74) *Attorney, Agent, or Firm* — Vidas, Arrett & Steinkraus, P.A.

(57) ABSTRACT

A cyber-life electronic commerce and system control device is disclosed having a three dimensional or other image of an area stored on a server. An operating exchange interfaces with the image to enable an individual to manipulate virtual control elements within the operating exchange. A visible light embedded communication system is used as the backbone to communicate commands from the operating exchange to a building operating system control item in order to alter the setting or status of a building operating system. The operating exchange may also be used by a consumer to virtually explore a cyber-retail location and to engage in commercial activities.

16 Claims, 10 Drawing Sheets

(56) References Cited

U.S. PATENT DOCUMENTS

| | | | |
|---|---|---|---|
| 2005/0243173 A1* | 11/2005 | Levine | H04N 7/185 |
| | | | 348/164 |
| 2005/0252984 A1* | 11/2005 | Ahmed | F24F 11/30 |
| | | | 236/51 |
| 2007/0098407 A1* | 5/2007 | Hebrank | G08C 23/04 |
| | | | 398/106 |
| 2008/0310850 A1* | 12/2008 | Pederson | G07C 9/00158 |
| | | | 398/135 |
| 2009/0129782 A1* | 5/2009 | Pederson | H04B 10/1143 |
| | | | 398/135 |
| 2011/0037712 A1* | 2/2011 | Kim | H04M 1/7253 |
| | | | 345/173 |
| 2012/0138420 A1* | 6/2012 | Leibu | G07D 5/02 |
| | | | 194/338 |
| 2012/0179983 A1* | 7/2012 | Lemire | G06F 17/30905 |
| | | | 715/757 |
| 2012/0183301 A1 | 7/2012 | Pederson | |
| 2016/0190807 A1 | 6/2016 | Wendt | |

* cited by examiner

CYBER LIFE ELECTRONIC NETWORKING AND COMMERCE OPERATING EXCHANGE

CROSS REFERENCE TO RELATED APPLICATIONS

This application is a continuation application and claims priority from U.S. patent application Ser. No. 14/597,648 filed on Jan. 15, 2015, currently abandoned. U.S. patent application Ser. No. 14/597,648 filed on Jan. 15, 2015 claims priority to U.S. Provisional Application Ser. No. 61/927,663 filed Jan. 15, 2014, the entire contents of which is expressly incorporated herein by reference.

The subject matter of this application is also related to U.S. patent application Ser. No. 14/597,518 filed Jan. 15, 2015, the entire contents of which is incorporated herein by reference.

BACKGROUND

In the past, individuals have been required to physically walk to a building system control device to alter a building system status. Two examples of building system control devices may be light switches and/or a thermostat. In many cases a building system is electrically coupled to a building system control device by wires.

In some modern structures, the control of a building system may be provided by an on-site computer, provided that a user may identify the current location of the electronic file for the control of the building system on the facility computer or server.

In the past it has been difficult for individuals to locate a building system control device, because either the building system and/or the building system control device has been stored within folders, sub-folders, and/or individual files on a facility computer system. In these instances, extensive time and expenditures have been required in the training of individuals to access and manipulate building system control items. In addition, cultural, educational and language barriers have made training problematic and costly in some instances.

In the past, individuals have been required to be physically present in a building or at a retail location to engage in the control of a building system or engage in commercial activities. Alternatively, in order to engage in commerce, an individual was required to use an electronic device to visit a website to browse or search for pictorial images or descriptions of items for purchase. An individual was required to use an actuator such as a mouse or button to select items for purchase. The individual was then required to type or enter electronic payment information to complete a transaction.

It has not been known to provide a user-friendly system to engage in building system control management, or to improve commerce, through the provision of an operating exchange having an operating system in communication with a visible light embedded communication system.

FIELD OF THE INVENTION

In some embodiments, the present invention is directed to a cyber-life electronic commerce and system control device having an operating exchange which is used in conjunction with a visible light embedded communication system to regulate and manage controls for building operating systems as well as to improve a purchaser's on-line electronic retail commerce experience.

GENERAL DESCRIPTION OF THE INVENTION

In some embodiments, a computer server is provided, the server having a stored three dimensional image of a building, structure, area, or retail location. In some embodiments a computer/server is in communication with an visible light embedded communication system and/or a system control device. In some embodiments an operating exchange and operating system is provided where the operating system is stored on the server which interacts with the stored three dimensional images of a structure/retail location in order to provide to an individual an interface to a building operating system control device and/or items within a retail location. In some embodiments the interface is in communication with the operating exchange and at least one control item for a building operating system or at least one item within a three dimensional representation of a retail location.

DESCRIPTION OF THE INVENTION

Figure 1A:
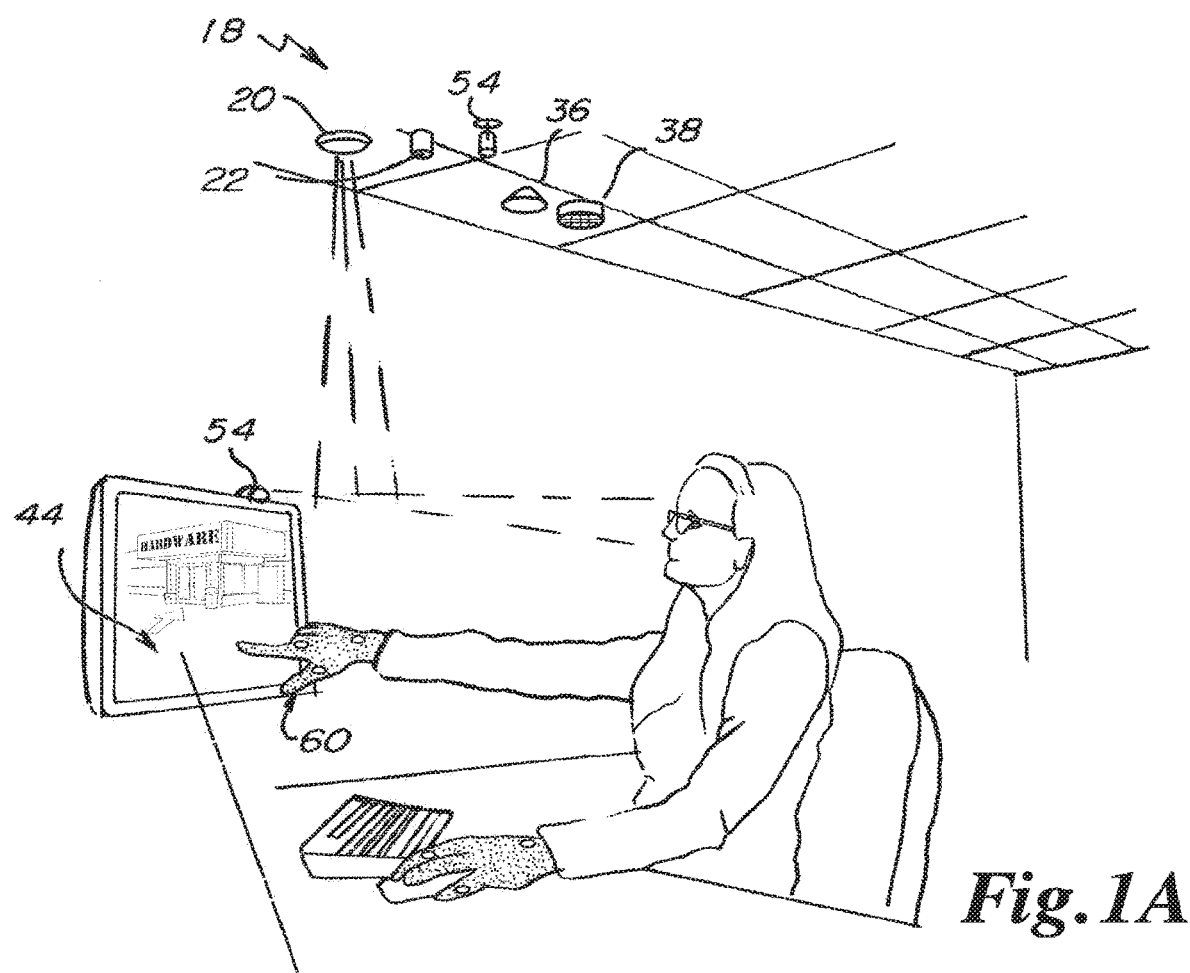
FIG. 1A is a pictorial representation of one embodiment of the invention where an individual is interfacing with an operating exchange in communication with a visible light communication system to engage in electronic commerce activities.

In some embodiments, a building, structure or facility 12, includes a plurality of building operating systems 14, example of which include but are not necessarily limited to light systems, intercom or public address systems, fire alarm systems, HVAC systems, elevator control systems, security systems, and plumbing systems to name a few. In some embodiments, each building operating system 14 may include a building operating system control item 16 which may be used to control or regulate the applicable building operating system 14.

In some embodiments, building operating system control items 16 are centrally located and in other embodiments the building operating system control items 16 are located adjacent to the respective building operating system 14. In some embodiments one or more building operating system control items 16 may be electrically connected and in communication with a facility computer/server/controller through the use of wires 70.

In alternative embodiments, a building structure or facility 12 may include a plurality of LED light fixtures 18, where each LED light fixture 18 is constructed and arranged and/or adjusted to engage in visible light embedded communication activities to provide visible light communication. A more complete description of visible light embedded communications is disclosed in United States patent Numbers and patent application numbers: Ser. No. 14/557,705; 14/546,223; 14/546,218; 14/537,470; 14/290,152; 14/288,917; 14/270,670; 14/227,375; 14/208,129; 14/208,125; 14/208,103; 14/208,090; 14/207,955; 14/207,934; 14/050,765; 13/706,864; 61/927,663; 61/927,638; U.S. Pat. Nos. 6,879,263; 7,046,160; 7,439,847; 7,902,978; 8,188,861; 8,188,878; 8,188,879; 8,330,599; 8,331,790; 8,542,096; 8,543,505; 8,571,411; 8,593,299; 8,687,965; 8,744,267; 8,751,390; 8,886,045; 8,890,655; 8,890,773; and 8,902,076, the disclosures of which are incorporated herein by references in their entireties.

In some embodiments, one or more building operating control items 16 include or are connected to a light emitting diode 20, photodetector or photodiode 22, and/or a controller 24, in any combination. The building operating control items 16 may also be connected, coupled or engaged to motors, valves, or the mechanical or electrical devices which may be operated by electrical signals to change the status and or the setting of a building operating system control item 16.

In some embodiments, not all of the control items 16 are required to include LED communication devices, and some control items 16 will be in direct communication with a building operating system 14 via wires 70. In alternative embodiments, a control item 16 may be wired, where the wire extends to an intermediate pulsed light communication hub 26. The intermediate pulsed light communication hub 26 includes a unique location identifier 28, controller 24, photodetector(s) 22 and LED's 20 and is adapted to receive pulsed light communication signals which alternatively may be referenced to as visible light embedded communication signals. The controller 24 of the pulsed light communication hub 26 processes received pulsed light communication signals for conversion into electrical signals, to be passed over the wire 70 to a particular control item 16, to change the status of the control item 16 and building operating system 14.

In some embodiments, each LED light fixture 18, LED dongle device 30, and each control item 16 includes processors/controllers 24, LED's 20, and photodetectors 22 to generate and/or receive visible light embedded communications within a pulsed light communication system. The embedded pulsed light signals may communicate information as to the status of a LED light fixture 18, dongle 30 or control item 16. In some embodiments, each control item 16 of a building operating system 14, such as a lighting system, heating system, security system, monitoring system, metering system, recording system, speaker system, elevator system to name a few, either has an integral LED photodetector 22 and/or controller 24 and LED's 20 for embedded pulsed light communications. Alternatively an operating system 14 or control item 16 may be retro-fitted to include an LED communication device such as a dongle device 30 to receive embedded pulsed LED light communication signals from an LED light fixture 18, and to generate and communicate embedded pulsed LED light signals for receipt by an LED light fixture 18 to provide information in response to a status inquiry.

In some embodiments, each control item 16 may include sensors, meters, controllers/processors 24, photodetectors 22, and LED's 20 to receive and to generate embedded pulsed light communication signals to a facility control unit 32. In some embodiments, each control item 16 may function to be electrically connected to, and in communication with, motors, devices, servo motors, valves solenoids, or other mechanical or electronic devices which are used to alter the status of a building operating system 14 or control item 16 such as a door lock, a thermostat, a light switch 34, an elevator control, a speaker 36, a microphone 38 and/or a monitor to name a few. It should be noted that the identified elements for the control items 16, building operating systems 14, system elements, or other identifiers herein are not intended to be exhaustive, and should be interpreted as expansive and are not intended to be limiting as to the specific elements or types of elements as identified herein.

In some embodiments, the facility control unit 32 and/or each control item 16 includes a processor/controller 24 which includes a security protocol to restrict activation or a change of status until such time as the security protocol has been satisfied. A security protocol may be communicated directly through embedded pulsed LED light communication signals or through an intermediate embedded pulsed LED light communication hub 26, or via an electrical signal passed over a wire 70. In some embodiments a change of status for a higher security clearance control item 16 will require additional security verification or security protocols as included with an embedded pulsed LED light communication signal and will automatically generate a security communication to a remote server 72 or facility control unit 32 as a security warning to another individual.

In some embodiments, the processor/controller 24 in communication with each control item 16 receives control signals, activation signals, or change of status signals which were generated from a facility control unit 32, or other remotely located control server 72, or other system server. In some embodiments, the processor/controller 24 is in communication with each control item 16 which may generate a device or operational status signal to be received by a facility control unit 32, remotely located control server 72, or other system server. The device or operational status signal in some embodiments is generated and transmitted by embedded pulsed LED light communication signals, as described herein or as incorporated by reference herein.

In other embodiments, functions such as microphones 38 and speakers 36 may be regulated if equipped with an embedded pulsed light communication interface such as a dongle device 30.

In some embodiments, a facility control unit 32 and/or remote server 72 may include a or webpage. The webpage may have access to drawings, diagrams and/or blueprints of a structure 12, where an operating exchange 44 on a facility control unit 32 permits an individual to manipulate building operating systems 14 and control items 16 within a building 12. In some embodiments, the webpage functions as the interface to enable the activation/deactivation or manipulation of a building operating system 14. In some embodiments, an individual may focus on a desired location on a drawing, diagram and/or blueprint of a building 12 in order to access a building operating system control item 16 to toggle or manipulate the control item 16 to a desired setting. The drawing, diagram, and/or blueprint of the building 12 may include reference to any number of switches and/or controls for building operating systems 14.

In some embodiments, the switches and/or controls for a building operating system 14 may include sensors, meters or other electrical or mechanical setting devices to communicate feedback as to the current status of a system setting, for the building operating system 14.

In some embodiments, the drawings, diagrams and/or blueprints of a building 12 as included in a facility control unit 32 or remote server 72, may include markers/identifiers, such as rectangles or other shapes, which represent LED light fixtures 18 or groups of LED light fixtures 18 or other systems or system control items 16.

In some embodiments, the facility control unit 32 and/or remote server 72 may also include indicators as to operational performance such as the volume of electricity being used, or the setting of a building operating system 14, such as operation at a maximum level, as opposed to operation at a normal operational parameter.

In some embodiments, a map, drawing, diagram, blueprint or other two dimensional or three dimensional image may be made of a building 12, complex, or other geographic area. The map, drawing, diagram, blueprint, two dimensional or three dimensional image of the building 12, complex or geographic area may be used as an overlay in a software application for an operating exchange 44 for a facility control unit 32 or remotely located control server 72.

In other embodiments, 3-D or laser imaging equipment may be utilized to form a virtual 3-D model for a building 12, complex or geographic area. In some embodiments, in a matter of hours, an individual using laser imaging equipment may walk through and scan an entire structure 12, mapping out all of the hallways 46, rooms 48, doorways 50, lights 52, light switches 34, thermostats, monitors, cameras 54, microphones 38, speakers 36, fire alarms, and smoke detectors, to name a few, and in doing so, form a three-dimensional walk through model for a structure 12 or other geographic area.

Following scanning in some embodiments, the 3D representation of the building may be partially transparent or a skeleton view, where elements such light fixtures 52, light switches 34, or control items 16 are visible. In alternative embodiments, the laser imaging of a building 12 may be in color or mono-chrome. In other embodiments, the operating exchange 44 may assign various colors to designated portions of the virtual cyber-building. For example, hallways 46 may all be designated in a color such as beige and all of the rooms 48 may be designated by the color green.

In some embodiments, the appearance of the space within a virtual cyber-building may be smaller or larger in appearance than the actual space of the structure 12.

In at least one embodiment, an operating exchange 44 is utilized in association with a visible light embedded communication system or a pulsed light communication system, using LED embedded pulsed light communication signals generated from LED light fixtures 18. In some embodiments the operating exchange 44 is incorporated into the infrastructure of a building or facility control unit 32 or remote server 72 in communication with LED light fixtures 18 and building operating systems 14. In some embodiments the operating exchange 44 includes a software operating system performing the features and functions as identified herein.

In some embodiments, the operating exchange 44 is used to control all of the LED light fixtures 18 and building operating systems 14 within a structure or building 12. In some embodiments, the operating exchange 44 may be in communication with more or less than all of the LED light fixtures 18 or operating systems 14 for a building 12.

In at least one embodiment, the operating exchange 44 includes indicators which function to communicate the setting and/or operational status of one or more building operating systems 14 such as LED light fixtures 18, or other building systems, such as a thermostat.

In at least one embodiment, the operating exchange 44 includes indicators for the color, or color setting, for light generated by the LED's 20 within the LED light fixtures 18. In some embodiments, the color of the LED's 20 within the LED light fixtures 18 may vary between individual and/or groups of LED's 20 and/or LED light fixtures 18.

In some embodiments, the use of embedded pulsed light communications to control the building operating systems 14 through an interface with an operating exchange 44 of a cyber-building replaces a building network based on radio frequency or a WIFI system. Networks based on radio frequency or WIFI may become saturated, loosing speed or dropping signals, especially if a number of people in a specific area are using a common network.

In at least one embodiment, the operating exchange 44 is constructed and arranged to simulate or represent real life actions for control of a building operating system 14 in order to facilitate ease of use, and eliminate costly training and specialized education for designated individuals. In at least one embodiment, the operating exchange 44 will not utilize commands, command lines, file location, or sub-file memorization by an individual in order to control or regulate a building operating system 14.

In some embodiments, the operating exchange 44 and the virtual cyber-building may include cyber display signs and/or cyber directional markers to facilitate the recognition of a cyber-location and/or the identification of the location for a control element access panel 58 for a user within a virtual cyber-building.

In some embodiments, a cyber-sign or display may facilitate access to an instruction or to a control item 16 which is otherwise not immediately available, one example of which may be a critical function item which under normal operation is not subject to adjustment, or alternatively to a security item.

In some embodiments, an individual may use the operating exchange 44 within a virtual cyber-building to test different operating systems 14, or may adjust the status of different operating systems 14, an example of which would be fire alarms, camera systems, audio systems, HVAC systems, intercom systems, elevator systems, telephone systems, and/or security systems to name a few. It should be noted that the building operating systems 14 identified herein have been provided for purposes of illustration and are not exhaustive of the types of systems which may be controlled through the operating exchange 44 of a virtual cyber-building. It should also be noted that in some embodiments, the above and other types of operating systems 14 are integrated into a network, and that at least one type of backbone for a network is the embedded pulsed light communication system as described herein or as incorporated by reference.

In some embodiments, scheduling and programming of building operating systems 14 may take into consideration variables such as daylight savings time, temperature settings based on the time of year, and other variables considered during the operation of a building, the above examples not being limiting in this regard.

In some embodiments, a network may be provided through the use of a remote server 72. The backbone for the remote access to the operating exchange 44 may be an embedded pulsed light communication network, where embedded pulsed light communication signals are transmitted through free space. One example of a visible light embedded communication system may be a series of street lights, or other adjacent light sources, for sequential transmission of information or data embedded in a pulsed LED light signal, until such time as the pulsed LED light signal arrives at the desired destination.

In some embodiments, an individual may speak any language or have any educational background or training, and may be able to immediately and intuitively operate the operating exchange 44 for the embedded LED pulsed light and communication system and building operating systems 14. In some embodiments, the operating exchange 44 is not dependent on culture or gender or knowledge of an individual.

In some embodiments, the operating exchange 44 and an interface device 60 do not require significant training, and eliminate the need for an individual to know the location of controller commands on a computer, whether located in files or sub-files in a building operating system 14. The operating exchange 44 and the interface device 60 enable a user to engage in known life activities, such as walking to a desired location within a virtual 3-D image for a desired operating system 14 in order to implement system status modifications. For example, an individual desiring to modify the status of an elevator will virtually walk up to the elevator in a cyber building and pull open the control element access panel 58 or port to retrieve or to manipulate a virtual control element 62 within the control element access panel 58. A command may then be processed by the operating system for the operating exchange 44 which may generate an embedded pulsed light communication from an LED light fixture 18 adjacent to a physical elevator control panel, where the pulsed light communication signal is received by a photodetector 22 and processor/controller 24 integral, attached to, or in communication with the physical elevator controls to modify a status setting. Alternatively, the command may be communicated by pulsed light communication signals to an intermediate pulsed light communication hub 26 where the embedded pulsed light signal is processed, and in turn is communicated to the elevator control panel over a wire 70 to alter or modify the status of the building elevator system.

In at least one embodiment, a user is not required to know where an instruction, interface, or control item 16 is located, and the user is only required to be able to recognize a virtual building system control element 62 and know where the building system control element 62 is located relative to the operating system 14 within a cyber-building. To operate an elevator, an individual will walk up to the elevator in the cyber-building and access the control element access panel 58 and the virtual control element 62. Alternatively, to operate a furnace or boiler, an individual will walk to the furnace or boiler in the cyber-building and access the control element access panel 58 and virtual control elements 62.

In some embodiments, the architecture of the operating exchange 44, the operating systems software, and the virtual cyber-building are sufficiently simplistic where an individual without explanation or training may modify, operate, and/or control building systems 14 through the seamless backbone of the embedded pulsed light communication networks or systems.

In some embodiments, the operating exchange 44 will be language neutral and include images for the virtual control elements 62, such as clocks to represent timing functions, and buttons or switches for lights, or rectangles having an image of fire for a fire alarm, to name a few of the many examples available. Therefore, in some embodiments, the operating exchange 44 is not required to be modified for use with other languages unless images or symbols are not readily recognized from a cultural perspective.

In some embodiments, each building utilizing LED light fixtures 18 of an embedded pulsed light communication system may include a map representing the location of each of the LED light fixture 18 where each LED light fixture 18 includes a unique identifier 28 similar to a MAC address, standard internet protocol identifier, the GPSRS Global Positioning System Routing System as more fully described in the above referenced commonly owned patents and patent applications which are incorporated by reference herein in their entirety, or other types of identifiers.

In some embodiments, each virtual control element 62, switch, activation device, keypad, button or dial, to name a few, may include a unique identifier 28. In addition, each photodetector 22, LED lighting element 20, a dongle device 30, sensor, monitor, or other devices used to establish communication within an embedded pulsed light communication system may include a unique identifier 28.

In some embodiments, each LED dongle device 30, and each virtual control element 62 may include a unique identifier 28 which may be, or may be similar to the GPSRS location address, MAC address, or an alpha-numeric, or numeric identifier to precisely locate the virtual control element 62 relative to the map, diagram, drawings, image, 2D model, 3-D model and/or blueprint of a structure 12 as included within a facility control unit 32 or remote server 72.

In some embodiments, within the virtual image of the building 12 within the software operating system of the operating exchange 44, the control element access panel 58 or port may be a virtual drawer 64 or virtual access door which when opened exposes a virtual shelf.

In some embodiments, an individual using the interface device 60 may enter the virtual building 12, walk to a designated location such as to a light switch, and open a control element access panel 58 or port by sliding open a drawer 64 or opening an access door to view the virtual contents of the drawer 64 or shelf.

In some embodiments, inside the drawer 64 or on the shelf will be located a plurality of virtual control elements 62, which would appear in any shape as desired, such as a clock 66 used for setting a timing schedule to activate or deactivate the control item 16 such as a light switch 34. Another example of a virtual control element 62 could be a calendar 68 which could be used for scheduling the activation or deactivation of a control item 16 on a certain date, such as shutting off lights on a Friday evening at 7:30 pm and turning the lights on at 6:00 am on a Monday morning.

In some embodiments an individual may use a central or single virtual control element 62 such as a tablet computing device to control any number of control items 16 to manipulate a setting for a building operating system 14.

In other embodiments, a single or central control element such as a cellular phone, tablet computing device, laptop computer or other portable electronic device may include a dongle interface 30 for use in manipulation of the status of a virtual control element 62 or control item 16 of a building operating system 14. In some embodiments, an individual transporting a portable electronic device may walk up to a building operating system 14 to activate the portable electronic device, or software application on the portable electronic device, to initiate the control item 16 to alter the setting or status of the building operating system 14. In this embodiment, the dongle device 30 may communicate directly with the control item 16 through visible light embedded communication signals. Alternatively, the dongle device 30 may transmit a visible light embedded communication signal to an LED light fixture 18 which in turn may communicate the visible light embedded communication command to a photodetector 22, on or in communication with, the control item 16, to alter a building operating system 14 setting. In some embodiments, the electronic device functioning as the signal or central control element may be remotely located relative to the control item 16 and communicate a desired command to a building operating system 14 through a dongle device 30 into an LED visible light embedded communication system or network.

In other embodiments, when an individual is using the operating exchange 44 to enter a virtual cyber-building 12, an individual may grasp a virtual control element 62, such as a virtual representation of a calendar, and the individual may walk in the virtual cyber building to a virtual operating system 14 such as an elevator. The operating system software will recognize the presence of the individual proximate to the elevator. The individual may then manipulate the virtual control element 62, such as the calendar 68 to adjust a setting, such as disengaging the elevator on a Saturday and scheduling the reactivation of the elevator on a Monday morning. The operating system software of the operating exchange 44 recognizes the adjustment of a building operating system 14 and implements the authorized commands for activation of the building operating system control item 16 at the appropriate dates and/or times.

In other embodiments, the virtual control element 62 may be a universal element and may include a number of different functions such as a calendar, clock, switch, dial, and/or color palette to name a few. In this embodiment an individual may be able to virtually walk in a cyber-building 12 from one operating system 14 to another and to use the universal virtual control element to alter the status and/or settings for any number of building operating systems 14.

In some embodiments, the control items 16 and/or virtual control elements 62 are restricted to operations or functions available only at a specific control element access panels 58 for a building system 14. For example control items 16 and/or virtual control elements 62 related to a control element access panel 58 or port for a light switch, would be exclusively interfaced with the building lighting system, and would not include control items 16 and/or virtual control elements 62 directed to the air circulation or air conditioning. Control items 16 and/or virtual control elements 62 for the air circulation/conditioning/cooling system would be located in a control element access panel 58 or port proximate to an air condition unit, which in the virtual 3-D image for the building 12 may be located on a roof or mechanical room or area.

The manipulation of the virtual control element 62 within the virtual 3-D image of the building modifies the building operating system 14 to accommodate the selected settings. At the selected or appropriate time, which could be simultaneously, the building operating system 14 on the facility control unit 32 will signal a change in status to a control item 16, either through a signal transmitted over a wired electrical connection 70 or by initiating the transmission of a pulsed LED light signal through an LED light fixture 18 to be received by a photodetector 22 at or in communication with the control item 16. The control item 16 will then implement the status change such as turning on or off a particular light fixture 18. It should be noted that this identified process is equally applicable to other building systems as identified herein, including HVAC, fire, camera, speaker, microphone, security, as well as all other types of building operating systems 14 which may be regulated by an individual.

In some embodiments, dependent on the building system 14 to be operated, the area or space within the control element access panel 58 will be enlarged, and the number of virtual control elements 62 accessible through the control element access panel 58 will be increased. For example, a drawer 64 as the control element access panel 58 for a light fixture may be smaller and include fewer virtual control elements 62 as compared to the drawer 64 for the control element access panel 58 for an HVAC system. In some embodiments, the appearance of the control items 16 and/or virtual control elements 62 is selected to as closely as possible represent the function to be regulated. For example, a calendar 68 may be selected to represent the function of date scheduling. In another example, a watch or clock 68 may be selected to represent a timing function. In another example, a thermometer may be selected to represent a temperature setting. Numerous additional alternatives are available. In at least one embedment, the appearance of the control items 16 and/or virtual control elements 62 is selected to minimize confusion to an operator or user. In some embodiments, a control element access panel 58 may include multiple shelves or drawers and/or virtual control elements 62 which may be placed according to an anticipated frequency of use, where certain virtual control elements 62 are located behind other virtual control elements 62 in a subordinate location. In some embodiments, a control element access panel 58 may include multiple shelves or drawers and/or virtual control elements 62, where one or more shelves or virtual control elements 62 may have a restricted access indicator requiring entry of an additional security clearance prior to a status change for a building system 14.

In other embodiments, a control element access panel 58 may include a virtual control element 62 which itself is another sub-control element access panel including sub-control items.

In some embodiments, a virtual cyber-building for a structure such as a school will include numerous control element access panels 58, for example, a control element access panel 58 at the front door, the office, the principal's office, the custodian office, the mechanical room, and the lunchroom. Each of the control element access panels 58 at a different location may include virtual control elements 62 used to manipulate different systems, or functions. In some embodiments, a building 12 may include security cameras 54 which may be manipulated through a control element access panel 58 located at a security station within a virtual cyber-building by modification of the camera control item.

In some embodiments, the virtual control elements 62 within the control element access ports 58 may be 3-D pictorial application, or applications as used on a smart phone, tablet device or other electronic device.

In some embodiments, a virtual control element 62, such as a calendar 68, regulates days of operation; a stopwatch regulates hours of operation; a video camera regulates areas of recording images; an elevator control panel regulates default settings or operation of the elevator; a thermometer regulates temperature; and/or a fire alarm box regulates operational status such as a fire alarm. In some embodiments, the same or different virtual control elements 62 may be located on a virtual computer within the virtual cyber-building for activation and/or modification by an individual using an interface device 60. In some embodiments, the virtual control elements 62 may be displayed on a large video screen within an operating exchange 44.

In some embodiments the operating system software for the operating exchange 44, including the virtual 3-D image model, may be accessed by an interface device 60 which may be pulsed light transceiver glasses 74, virtual reality glasses, motion detectors or sensors, or manual controllers such as toggles or joy sticks, which are in communication with a display device. The interface device 60 may be used to access the operating exchange 44 in a manner similar to a videogame controller and display on a monitor, image projector screen or television.

In some embodiments, an individual using an interface device 60 may be required to satisfy logon, password and/or other security protocols, in order to access the building virtual 3-D image/map within the operating exchange 44. An individual using an interface device 60 may then either observe or modify the operational settings and/or status of the building systems 14 which are in some embodiments communicated to the fixture control unit or controller 24 by pulsed LED light communication signals. Status or setting changes are integrated into the operating exchange 44 and virtual 3-D image/map for the building. In some embodiments, a user using the interface device 60 may either remotely or virtually observe, modify, or enter into the virtual 3-D building map/model as a walk through, or may select a specific area of the virtual 3-D building map/model for observation or manipulation.

In some embodiments, the use of the interface device 60 enables a user to virtually enter into a previous imaged building 12 in a manner similar to a video game, and observe the actual building systems 14 and control items 16 for a building.

In some embodiments, during use of the interface device 60 the control element access panel 58 having the virtual control elements 62, such as a light switch, may be located on a virtual wall. Each virtual control item 16 may include a unique identifier 28 which is used to specifically change the status of a particular building operating system.

In some embodiments, an individual may use one or more interface devices 60 such as LED light transceiver glasses 74 and/or motion sensors, and may walk through a cyber-building 12, to a particular geographic location to access a virtual control element 62. Movement through the cyber-building may in some embodiments occur with body gestures, posture-recognition, eye movements, or hand movements by an individual using a motion detector/sensor device such as virtual reality gloves or hand movement sensors. In addition, in some embodiments, a user may proceed through a cyber-building by using voice commands as recognized by voice recognition software or a combination of any of the above identified interface devices, including hand controllers, joy sticks, key pad directional elements, toggles, buttons, voice commands, gestures, or movements.

In other embodiments, camera(s) 54, which may be located on an LED light fixture 18, record images for processing by the operating system software including the voice, gesture, motion recognition software feature to name a few, where the voice, gesture and/or motion by an individual functions as the interface device in substitution for glasses or sensors as mentioned herein.

In some embodiments, an individual may use an interface device 60 such as visible light transceiver glasses 74 or other interface devices 60 while present at a remote location. The individual may pass through any required security protocols to logon to an operating exchange program 44 for a facility control unit 32 having a cyber-building 3-D virtual image. The individual may then make a gesture, eye movement, posture change, head movement, voice command, or other instruction, which is detected by the visible light transceiver glasses 74, other interface device(s) 60, and/or camera 54 and is translated into pulsed light communication signals which are communicated to an LED light fixture 18 as a portion of a pulsed light communication system. The pulsed light communication system may be connected to a broadband over power line system or directly to a remote control server 72. The remote control server 72 will receive the pulsed light communication signal such as a movement command and process the pulsed light communication signal to pass the command signal (which may occur over the internet) to the facility control unit 32 and/or the operating exchange 44 for the cyber-building. The individual using the interface device 60 may then walk through the cyber-building to a control element access panel 58 to modify the status of a virtual control element 62. Simultaneously, a reverse communication may be generated back from the operating system 14 to the facility control unit 32 (which may occur over the internet) back to the control server 72. The control server 72 then may activate an LED light fixture 18 to generate pulsed light communication signals for receipt by the visible light transceiver glasses or interface device 60 for transmission onto a display as used by the operator to confirm that a status change for an operating system 14 has occurred.

In some embodiments, a user of an operating exchange 44 for a cyber-building may employ the use of controllers, which are similar to appearance to a known video controllers, including a joy stick, as an interface device 60. Manipulation of buttons or the joy stick may facilitate an individual's movement down hallways 42, through common spaces, through offices, into elevators, or into other areas within the cyber-building to name a few. The manipulation of the controller enables an individual to move forward or backward, or to either side within a cyber-building.

In other embodiments, a key pad or a tablet electronic device may include keys or pressure sensitive areas to function as a interface device 60 for movement within the operating exchange 44 for the cyber-building. In some embodiments, any device which functions in a manner similar to a video controller may be used to facilitate movement within the virtual cyber-building.

In at least one embodiment, the control of one or more of the building systems 14 of a virtual cyber-building may be accomplished as simply as putting on a set of visible light transceiver glasses 74 and walking through the front door of the virtual cyber-building.

In some embodiments, the interface device 60 in communication with the operating exchange 44 enables a user to virtually access and/or control 3-D representations of visible surfaces, area controls, accessible information displays, and establish a desired orientation within a virtual cyber-building.

In some embodiments, the use of the interface device 60 in association with the operating exchange 44 provides sensory input to an individual which in turn improves an individual's memory as to the location of virtual control elements 62 and operation of the systems 14 of a building 12. In addition, a person using the interface device 60 in association with the operating exchange 44 will know the location of control items 16 which will be proximate to the building systems 14 to be controlled or modified. The use of the interface device 60 in association with the operating exchange 44 provides a much more natural interface with the systems 14 of a building.

In at least one embodiment, a user using an interface device 60 will view a very detailed image of a virtual control element 62 such as a calendar or light switch. In some embodiments, a virtual control element 62 may in fact be a virtual 3-D computer as a "living icon". An individual may access the virtual computer to regulate the systems 14 of a building 12.

In at least one additional embodiment, an individual wearing an interface device 60 for integration with the operating exchange 44 may virtually enter any hallway 46 or other building area, an example of which could be a gymnasium, within the virtual cyber-building and adjust a temperature or light setting for the selected area or hallway 46, including the use of an on-off timing feature, hot or cool temperature, and color setting for the lights within the selected area. In at least one embodiment, the facility control unit 32 and the operating exchange 44 will perform the necessary interpolations and/or calculations to generate the desired commands to regulate the number of power supply's, or to issue commands to one or more LED light fixtures 18 or other electronic devices over a pulsed light communication network. The processed commands include the unique identifiers 28 as assigned to each control item 16 and pulsed light communication system element within the building or structure. The operating exchange 44 will also determine if more than one, or a plurality of, control items 16 are required to be activated in order to implement the received command. An example would be to activate more than one, or a plurality of power supplies, or a plurality of LED light fixtures 18.

In some embodiments, the virtual interaction through the interface device 60 to the operating exchange 44 is designed to promote and maximize associated realities between the actual physical status of a building system 14 and the virtual cyber-building control elements 62.

In some embodiments, an individual may either access the operating exchange 44 at the actual building in an on-site setting, or alternatively, may remotely obtain access to the operating exchange 44 through a network such as the internet. If remote access is desired then security access, as well as logon protocols may be required.

In some embodiments, movement within a cyber-building may occur through body gestures, eye movements, posture recognition, voice recognition, body motion, head movements, and/or other types of recognition. The body, posture or other types of recognition may occur through the use of sensors attached to an individual. In an alternative embodiment, an LED light fixture 18 may include a camera 54 or other sensing device where the camera 54 will recognize the body, posture or other type of movement, and the controller 24 in communication with the camera 54 will convert the body, posture or other type of movement into a signal which may be passed to the operating exchange 44 for the facility control unit 32. In addition to visible light embedded communication the signals may be transmitted over a broadband over power line system, over the internet, or over a wired connection. In some embodiments, eye movements may be recognized through the use of cameras 54 or other sensors as incorporated into visible light transceiver glasses 74. The eye movement will be recorded and transmitted from the LED's as pulsed light communication signals from the frame of the visible light transceiver glasses 74 to at least one LED light fixture 18, where the pulsed light communication signal will be received and processed by the controller 24, for communication to the operating exchange 44 for the cyber building. In an alternative embodiment, an LED light fixture 18 having a camera 54 may recognize eye movement to process and communicate actions associated with the eye movement in a manner similar to that of the body or posture gestures. In some embodiments, movement within a cyber-building may alternatively occur by movements of an individual's head, such as a head tilt forward or a head tilt backward, or associated with movements of an individual's hands as recognized by one or more cameras 54 on an LED light fixture 18 or by motion sensors on an individual's hands, head or other body parts. In some embodiments particular types of hand gestures will be associated with specific control commands. For example an individual may approach a wall or a cyber-decal on a wall, and make a specific type of hand motion or gesture in the virtual space which will correspond to a specific command or function for manipulation of a control item 16. The operating exchange 44 will recognize the specific hand motion or gesture and issue the corresponding command to the control item 16.

In other embodiments, an individual may make a gesture, eye movement, posture change, head movement, voice command, or other movement, motion or instruction which is detected by the camera 54 and/or microphone 38 which may be located on an LED light fixture 18. In this embodiment, an individual's actions replace the use of an interface device 60. An individual's motions, sounds or actions as detected by the camera 54 and/or microphone 38 or other sensor are translated by the controller 24 into electrical signals which may be communicated as visible light embedded communication signals to another optical transceiver, or over a broadband over power line system/network. The additional optical transceivers and/or broadband over power line features may be elements of a pulsed light communication system or network. The signals representing the individual's motions, sounds, or action may then be communicated to the remote server 72, facility control unit 32, and/or the operating exchange 44, which in turn will process the signal into commands within the virtual cyber-building. An individual may then walk through the cyber-building to a control element access panel 58 to modify the status or setting for a virtual control element 62. In some embodiments the signals communicated to the remote sensor 72, facility control unit 32 and/or operating exchange 44 may occur over the internet or by broad band over power line.

In an alternative embodiment, motion sensors may be incorporated into a set or pair of visible light transceiver glasses 74 which may record head or body movement. In addition, a set of visible light transceiver glasses 74 may include motion sensors and cameras 54 to recognize movement and/or sense movement or recognize or sense eye movement as commands within the operating exchange 44 for a cyber-building. In some embodiments, the control items 16 and/or virtual control elements 62 may be activated by posture, gestures, motion, eye movement, manipulation of alpha-numeric keys, and/or voice recognition to name a few activation and control options.

In some embodiments, an LED light fixture 18 includes a camera 54 and a controller/processor 24 including facial recognition software, voice recognition software, image recognition software, posture recognition software, and movement recognition software to name a few.

In some embodiments the facial recognition, voice recognition, or other recognition software in communication with the operating exchange 44 may obviate or satisfy security protocols associated with access to and/or control of building operating system control items 16 and/or virtual control elements 62. The facial recognition, voice recognition, or other recognition as recorded by the camera 54 and/or microphone 38 may enhance access to the operating exchange 44 by eliminating the need for logon or password entries.

In some embodiments a camera 54 will provide a dynamic real time recognition and/or recording of an environment, individuals within an environment, or objects in an environment, for translation and incorporation into a real time cyber representation of a structure or environment.

In some embodiments, the real time and/or dynamic representation of individuals in a cyber environment will assist in rescue, firefighting or law enforcement activities. In this embodiment, the camera 54 interfaces with the operating exchange 44 which includes a 2-D or 3-D representation of an environment, or a map to a cyber location. The camera 54 records images which are processed by the controller 24 and communicated by visible light embedded communications or over a broad band over power line to a facility control unit 32 or remote server 72. The information recorded by the camera 54 may then be matched to a previously scanned image and meshed into, or super imposed on, the previously stored 2-D or 3-D cyber representation of the environment to provide a dynamic or real time cyber image of the individuals and objects within the environment. The operating exchange 44 and camera 54 may be used to continuously update, periodically update, or instantaneously update the previously stored 2-D or 3-D cyber representation of the environment to provide a dynamic fluid image of a cyber-environment for a user.

In some embodiments, the mapping of an environment includes the identification of objects and the positioning of objects with an environment for representation in a virtual cyber environment. This mapping may be sufficiently specific to record all objects within an environment including the identification of objects within drawers or in cabinets. In some embodiments, the camera 54 provides a dynamic or living representation of an environment, where the operating exchange 44 and the operating system software receives update images which may relocate the position of objects within the virtual cyber representation of an environment, to be consistent with the visual recordings within the subject environment. For example, a camera 54 may record an item being moved from a drawer to a cabinet. In at least one embodiment, the operating exchange 44 and/or the operating system software will relocate the scanned image, and alter the location of the scanned image to a current location with a cyber environment. In some embodiments an individual may be able to identify the current location of the cyber object by issuance of a voice inquiry processed by voice recognition or by other movement or actions.

In some embodiments, the motion, gesture, eye movement, head movement, and/or voice recognition software, to name a few, as in communication with a visible light embedded communication system communicates signals/commands as previously recorded by a camera 54 and/or microphone 38. The recognition software may be in communication with the operating exchange 44 as located on either the facility control unit 32 and/or a remote server 72. The signals from the recognition software may be passed to a destination through visible light embedded communications and/or over a broad band over power line system. In some embodiments, the signals from the recognition software may be incorporated into, become, or may be piggy-backed onto a WIFI, cellular and/or satellite transmission.

In some embodiments the destination of signals for the recognition software may be electrical or mechanical devices which may be operated through electronic controls. The electrical or mechanical devise include, but are not necessarily limited to devices such as robotic equipment, robots, drones, planes, automobiles, fork lifts, conveyers, molds, manufacturing equipment to name a few. In this embodiment, an individual may access an operating exchange 44 for entry into a cyber environment which may include controls for any type of electronic or mechanical device, a few types of which have been identified herein. A camera 54 on an LED light fixture 18 may then record images of an individual and/or a microphone 38 may record sounds for processing by the operating system software. The recorded images and/or sounds may then be processed by the recognition software for communication to the controls for the mechanical and/or electrical devices.

An individual may then be operating the mechanical or electronic device within the cyber environment where the visible light embedded communication system provides the backbone for the actual device controllers. In this embodiment, the cyber-life electronic commerce and system control device may be used in any number of fields including but not limited to manufacturing, communication, education, medicine, and commerce to name a few. In this embodiment, the camera 54 allows visualization of cyber objects and even visual magnification of cyber objects to provide vision assistance to an individual controlling remote or robotic functions. A physician may utilize any number of these features if desired to assist in a treatment procedure or robotic operation for a patient. An individual may also fly an aircraft or drone within a cyber environment where movements, gestures, and/or sounds are recorded and communicated at least partially over a visible light embedded communication system/network. In some embodiments command signals initially within a visible light embedded communication system may be super imposed or piggy-backed onto other communication networks.

In some embodiments recorded gestures, motion and/or sounds are converted to visible light embedded communication signals by controller 24 of an LED light fixture 18. The visible light embedded communication may then be transmitted to an adjacent LED light fixture 18 by broadband over power line or by visible light embedded communications.

In some embodiments if an object which is the destination of the visible light embedded communication includes an optical transceiver and controller, then visible light embedded communication signals may be used to communicate the control commands. If an object which is the destination of the visible light embedded communication does not include an optical transceiver and controller, then the visible light embedded communication signals may only be partially transmitted to the objects, where conventional signal communication techniques may be used for the last mile transmission.

In some embodiments, the security associated with the remote control of objects is improved through the use of visible light embedded communications regardless as to the inclusion of the use of an operating exchange 44 in association with a virtual cyber environment. Security is improved due to the inclusion or sequential inclusion of unique identifiers 28 which may be added to a data packet 210 as the data packet 210 moves from one component of a visible light embedded communication system to another component. In some embodiments the unique identifier 28 may include GPSRS information, a MAC address, a standard internet protocol identifier or another type of identifier. Therefore, a series or a collection of unique or sequential identifiers 28 form a portion of a data packet 210 which in some embodiments may be a command packet for operation or control of a device. The authenticity of the series or collection of unique identifiers 28 may be easily verified as a portion of security protocol to verify a command communication.

In some embodiments, an individual such as a teacher may walk into a room having an LED light fixture 18 and the camera 54 will record an image of the teacher. The facial recognition software or image recognition software will match the recorded image to stored images. If recognition is established then a controller 24, facility control unite 32, and/or a remote server 72 may activate one or more of the LED light fixtures 18 or computers, or other electronic devices in one or more areas. Alternatively, all of the lights and electronic devices may be activated by the generation of illumination comprising visible light embedded communication signals. In other embodiments, the LED light fixture 18 may include motion detectors which will automatically activate illumination upon detection of motion within a designated area. It should also be noted that electronic devices as located within a room or area may be adapted to receive, process and/or generate visible light embedded communication signals through the use of an LED dongle device 30. LED dongle device 30 as connected to electronic devices may be configured to transition from an inactive to an active status upon receipt of a pulsed LED light communication signal.

In some embodiments, the movement, posture, or gesture recognition software on the controller 24, facility control unit 32 and/or the remote server 72 may process a gesture or posture change as recorded by a camera 54 to activate one or more LED's 20 or to alter or to provide a desired color of illumination whether warm, cool, yellow, white or another desired visible color. In addition, gestures, posture changes, or movements as recorded by the camera 54 and as processed by the controller 24, fixture control unit 32 and/or remote server 72 may change brightness of illumination emitted from the LED's 20. In some alternative embodiments, an individual such as a teacher may use visible light transceiver glasses 74 to access an operating exchange 44 for a classroom. The teacher may open a control element access panel 58 and select a light color setting from a pallet of available colors included on a virtual control element 62 such as an artist's pallet, or another image including a plurality of colors.

In some embodiments, a space or area may be simultaneously occupied by an individual and manipulated as a virtual cyber space through an operating exchange 44 and use of an interface device 60 such as visible light transceiver glasses 74, camera 54, or other controller. A teacher may also in the middle of a lesson alter the environmental characteristics of a classroom through manipulation of a virtual cyber classroom according to the embodiments disclosed herein.

In some embodiments, upon the confirmation of the identity of the teacher by the facial recognition software, the facility control unit 32 may activate pre-programmed settings for automatic illumination of the LED lights 20 from the LED light fixture 18 to provide illumination over the teacher's desk. The camera 54 may also record the image of students in a classroom and the facility control unit 32 and/or controller 24 of the LED light fixture 18 may process the images of the students in the facial recognition software to confirm identity of the students, and may signal the LED light fixtures 18 within classroom to provide additional illumination. The facial recognition software on the controller 24, facility control unit 32 and/or remote server 74 may also be programmed to provide a security or warning signal if an individual in a classroom or other secure area is not recognized by the facial recognition software. In some embodiments, the lights or settings for a classroom may include personalized settings activated following facial recognition authorization.

In some embodiments, the camera 54 located in a classroom or school is in communication with a controller 24, facility control unit 32 and/or remote server 72, which in turn may include facial and/or voice recognition software. In at least one embodiment, if an individual is unrecognized, and a security threshold is triggered, then the remote server 72, facility control unit 32 and/or controller 24 may issue a visible light embedded communication signal to be received by an optical transceiver integral to or in communication with one, a plurality, or all of the door locks for one, a plurality, or all of the classrooms or other areas within a school. In real time any number of doors of a school may be locked in a security situation.

In some embodiments, an individual may access an operating exchange 44 to identify in real time, the location of students, teachers, staff or other individuals within a school. Real time location and/or tracking of a missing student may therefore be provided through the use of the visible light embedded communication system described herein. In at least one embodiment, a user of the LED light fixtures 18 and pulsed light communication system may be referred to as a hosting customer. A hosting customer, in some embodiments, may have a 3-D laser scan performed at a business location. The scanned 3-D image of a customer business may be stored on a control server 72 or facility control unit 32 which may include a premise site webpage. The premise site may be a retail business, a school, a building or an airport terminal to name a few examples. The premise site 3-D image or map may be accessed remotely by an individual authorized to receive the 3-D image, or by the general public, at the discretion of the host customer. Alternatively, access to the premise site may be regulated by security codes, encryption software or hardware, logon or password criteria.

In some embodiments, an entire mall may be scanned into a 3-D image and loaded into a control server 72 or facility control unit 32 as a premise site. In some embodiments, one or more or all of the retail locations within a mall may also be scanned into a 3-D image and loaded into a control server 72 or facility control unit 32 as a portion of a composite premise site, or as an independent premise site. The creation of a 3-D scanned image of a retail location and the use of the operating exchange 44 as described herein may significantly improve a customer's sales experience.

In some embodiments each retail location is a subscriber to the pulsed light communication services as identified or as incorporated by reference herein. In some embodiments, the control server 72 or the facility control unit 32 includes the operating exchange 44 as earlier described to establish a virtual cyber retail location which may include one or more virtual cyber retail outlets.

In some embodiments, a user may use a camera 54 of an LED light fixture 18 or an interface device 60 to access the operating exchange 44 for the virtual retail cyber outlet, and may walk through the virtual retail cyber outlet using movements, posture, gestures, eye movement, head movement or other actions as earlier described. A display of the virtual retail cyber location or virtual retail cyber outlet may be displayed on an individual's computer, lap top, television, tablet, smart phone or other electronic device. An individual using an interface device 60 such as visible light transceiver glasses 74 may walk through and access the virtual retail cyber outlet in a manner as previously described as related to the control of systems of a building.

In some embodiments, in a virtual retail cyber location an individual may be able to view retail items 82 available for purchase from a remote location through use of the interface device 60 and operating exchange 44 as integrated into the pulsed light communication network and fixtures. In addition, an individual user may visualize in the virtual retail cyber location features such as hallways 46, isles 80, common areas holding kiosks, or other areas. In each virtual retailer cyber outlet, a customer service station 78 may also be provided having a virtual cash register.

In some embodiments, the premise site and the 3-D model of the virtual retail cyber outlet enables a user to virtually, through the camera 54 or interface device 60 and operating exchange 44, to select items 82 for purchase, and to approach a customer service station 78 to complete a transaction for an item 82. In at least one embodiment, the use of the pulsed light communication system and network enables a user to communicate in real time with a retail sales associate. In at least one embodiment real time communication with a sales associate may occur through the microphone 38 and speakers 36 engaged to the LED light fixture 18 and/or the voice recognition software of the operating exchange 44. It is anticipated that the real time communication will occur at speeds in excess to that available through the use of cellular telephones. In addition, it is anticipated that the quality of the oral communication will also exceed the quality available through the use of cellular telephones and occur in real time.

In at least one embodiment, a sales associate may be receiving information from a terminal or computer, or alternatively may be wearing another interface device 60, or may be receiving communications from speakers 36 and/or microphones 38 of an LED light fixture 18 or LED dongle device 30 to communicate in real time with a customer.

In at least one embodiment, payment authorization for a virtual cyber transaction may occur through the exchange of information, by entry of data into a payment program, by scanning or any other payment option that may be available for electronic payment processing.

In some embodiments, the operating exchange 44 for the virtual retail cyber outlet will utilize the backbone and architecture of the LED pulsed light communication system as described and as incorporated by reference herein.

In some embodiments, a camera 54 as integral to a LED light fixture 18 may record an image of a customer, and a sales association in real time, for display to the other individual during a sale or exchange. Both a customer and a sales representative may be using an interface device 60 during a virtual cyber sales or exchange event. In some embodiments, the use by a customer and by a sales associate of an interface device 60 for access to an operating exchange 44 may occur without significant training to a customer. The live interface between a customer and a sales representative through the operating exchange 44 allows the customer to inquire about variables such as sizing for a particular brand or if an item will satisfy a customer's needs. The operating exchange 44 surpasses the know internet sales techniques of selecting an image from a screen and clicking a mouse. In some embodiments, the use of the camera 54 or interface device 60 in associate with the operating exchange 44 facilitates customer satisfaction by improving the opportunity for a customer to interact and to communicate inquiries to a sales associate in order to effectively select correct items for purchase.

In some embodiments, a supplemental 3-D scanned area may be added as an overlay or additional area to a previously scanned 3-D image of a virtual retail cyber outlet. The supplemental area may be an additional retail area such as a "back room" providing access to items for sale where an actual physical room at a retail location is not available.

In some embodiments, the 3-D image of the virtual back rooms may be formed by a temporary 3-D scan of an area, or at a remote location, which may be available from a retail chain or other retail location.

In addition, in some embodiments the 3-D image of the virtual retail cyber outlet is not required to physically include all sizes and all options for a selected item, and the selection and purchase of an item may be communicated to a central processing location to extract a particular size or color of an item from a larger inventory for shipment to a customer.

In some embodiments, the 3-D scan of a premise site is not restricted to a retail location but may include any location such as a skyscraper, museum, art gallery, work place, etc.

In some embodiments, a 3-D scan of a premise site may be stored in common objects or groups, and may be accessed by an individual using a camera 54 or an interface device 60 and operating exchange 44 in a manner similar to an individual retrieving a volume of a series. Groups of common or related premise sites may be combined into a collection which may have the appearance of a volume of a set. The user may select the desired group of premise sites within the selected volume and then retrieve an individual premise site to virtually explore through the interface device 44. In some embodiments, the selection of a particular premise site may include additional information available in electronic format such as movies, books, music, to name a few examples, which may be transmitted/communicated electronically via the visible light embedded communication signals to an individual using an operating exchange 44.

Figure 1B:
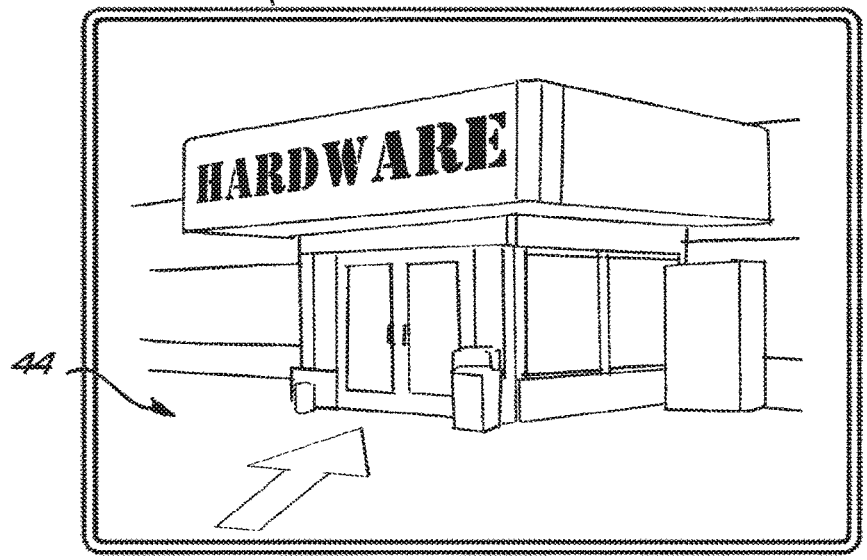
FIG. 1B is a pictorial representation of one embodiment of the invention where an individual interfacing with the operating exchange has selected and is about to enter into a virtual retail location as depicted in FIG. 1A.
Figure 2A:
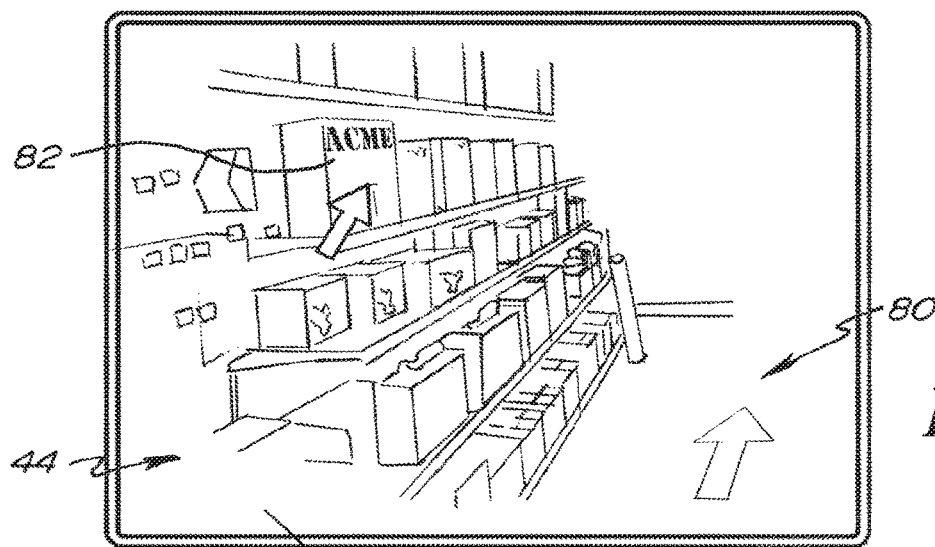
FIG. 2A is a pictorial representation of one embodiment of the invention where an individual interfacing with the operating exchange is virtually moving down an Isle of a virtual retail location as depicted in FIG. 1B.
Figure 2B:
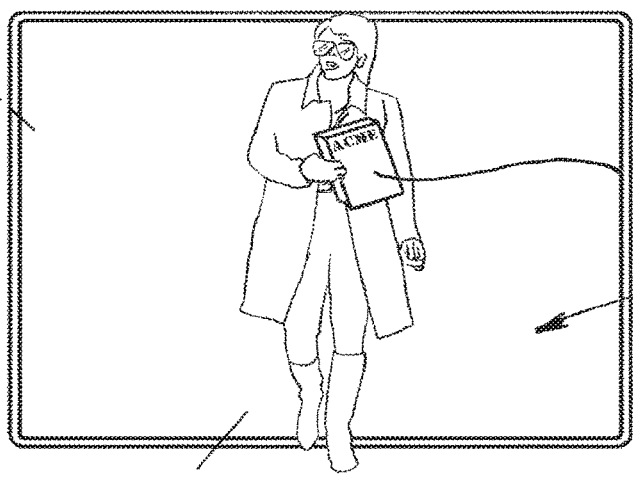
FIG. 2B is a pictorial representation of one embodiment of the invention where an individual interfacing with the operating exchange has selected a virtual item from the virtual Isle of FIG. 2A and is proceeding to a customer service location of FIG. 2C.
Figure 2C:
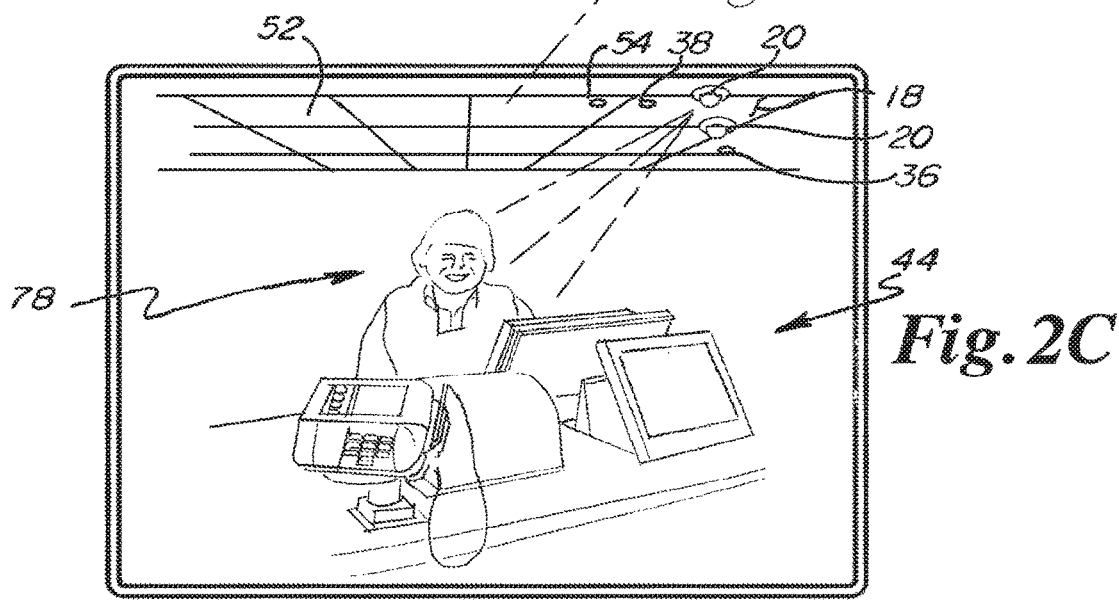
FIG. 2C is a pictorial representation of one embodiment of the invention where an individual interfacing with the operating exchange is communicating with a customer service representative at a customer service location to complete and an electronic commercial transaction.

In at least one embodiment as may be seen in FIG. 1A an individual is wearing a user interface device 60 such as visible light transceiver glasses 74 and motion sensitive gloves. The individual in FIG. 1A is accessing the operating exchange 44 through the user interface devices 60. In FIG. 1B the individual is moving to enter into a premise site for a virtual retail cyber location such as a hardware store having LED pulsed light fixtures 18 and visible light embedded communication capabilities. As may be seen in FIG. 2A the individual in the virtual retail cyber location is walking down an isle 80 browsing for desired goods. In FIG. 2C the individual has retrieved an item 82 and has moved in the virtual cyber location to present the item 82 to a customer service employee for purchase as depicted in FIG. 2C. In FIG. 2C the customer service employee is in communication with the individual in real time through the use of visible light embedded communication signals to complete a transaction as earlier described.

Figure 3:
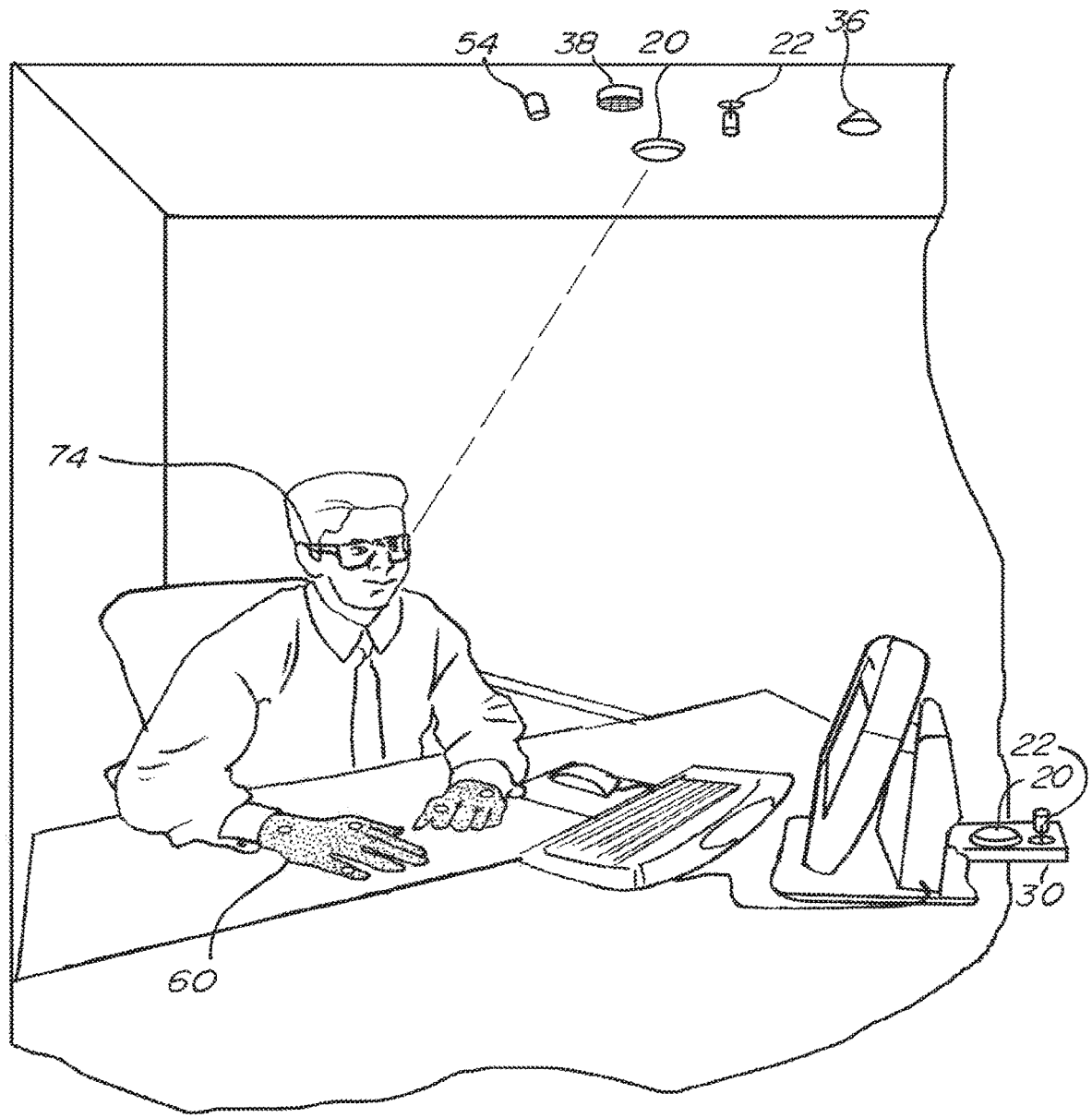
FIG. 3 is a pictorial representation of one embodiment of the invention where an individual is interfacing with an operating exchange for a structure.
Figure 4:
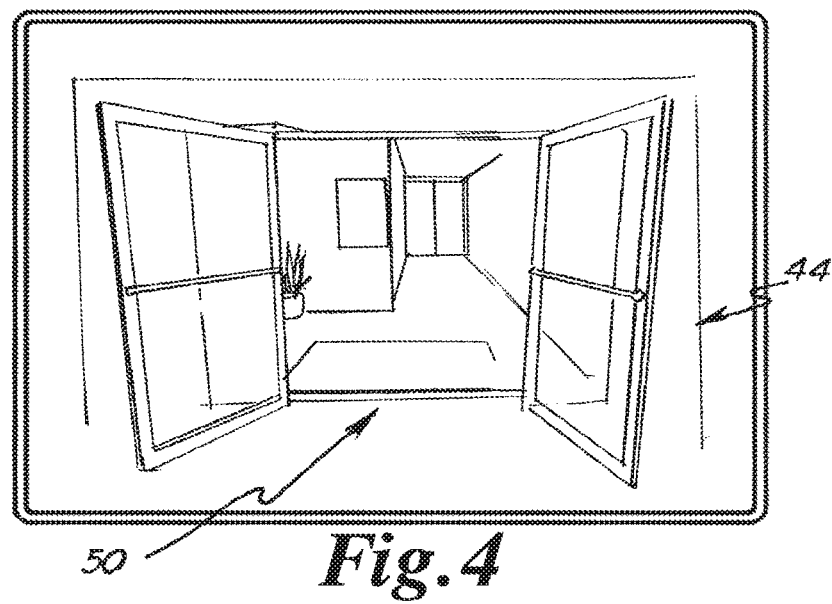
FIG. 4 is a pictorial representation of one embodiment of the invention where an individual interfacing with the operating exchange is virtually entering into a structure.
Figure 5:
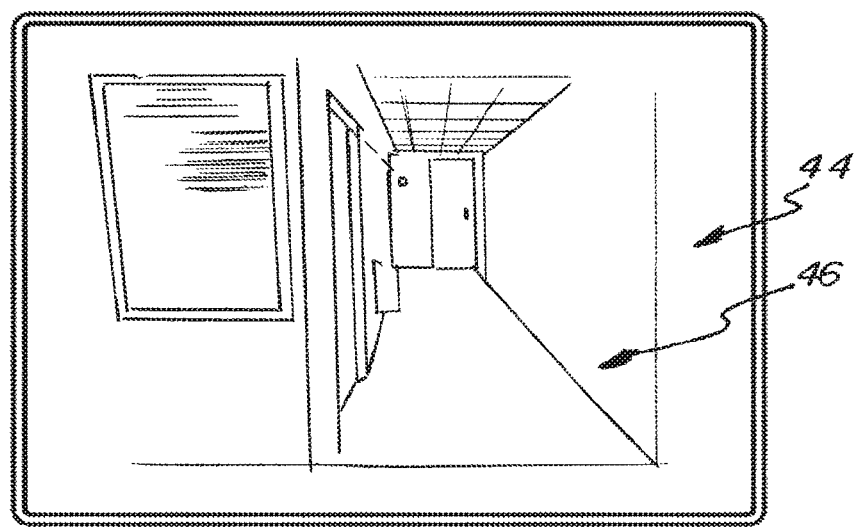
FIG. 5 is a pictorial representation of one embodiment of the invention where an individual interfacing with the operating exchange is virtually moving down a hallway of a structure as depicted in FIG. 4.
Figure 6:
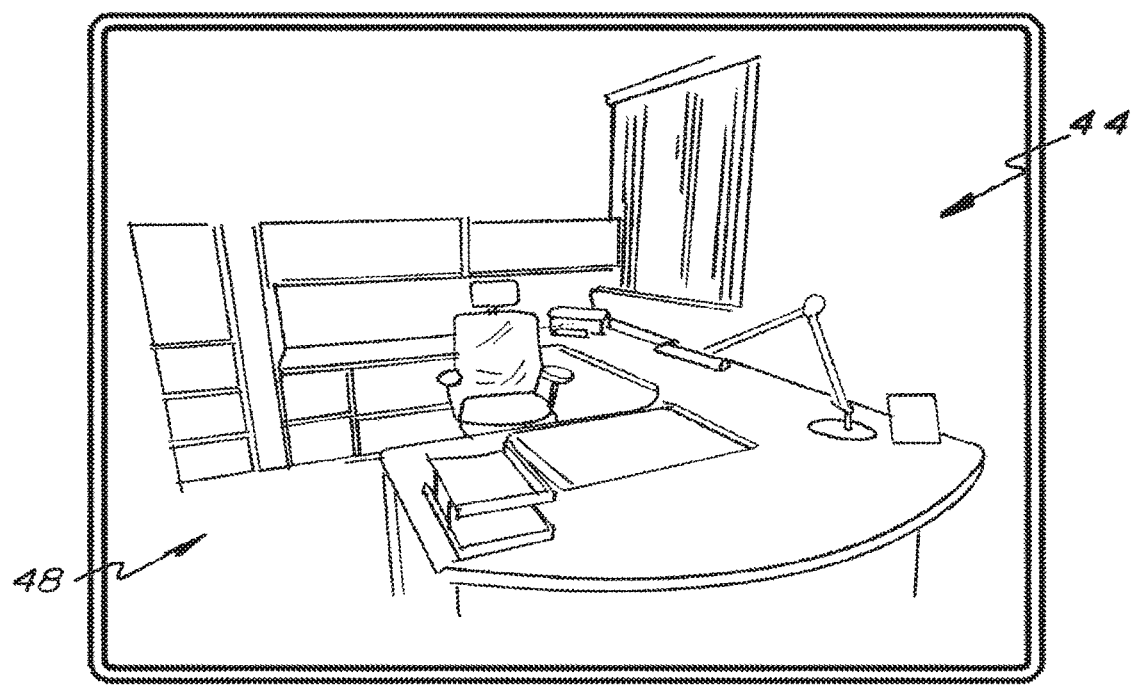
FIG. 6 is a pictorial representation of one embodiment of the invention where an individual interfacing with the operating exchange is virtually entering into an office along the virtual hallway of FIG. 5, within the structure.
Figure 7:
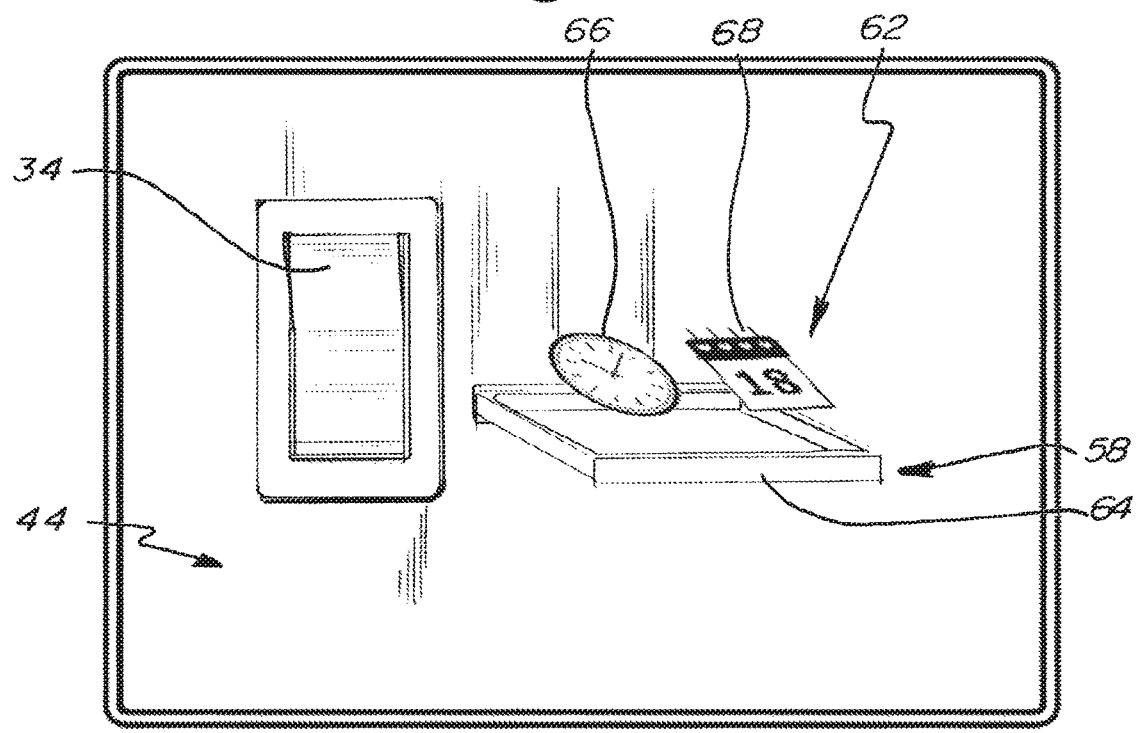
FIG. 7 is a pictorial representation of one embodiment of the invention where an individual interfacing with the operating exchange is virtually accessing a control element access panel of a building operating system within a virtual office of FIG. 6.
Figure 8:
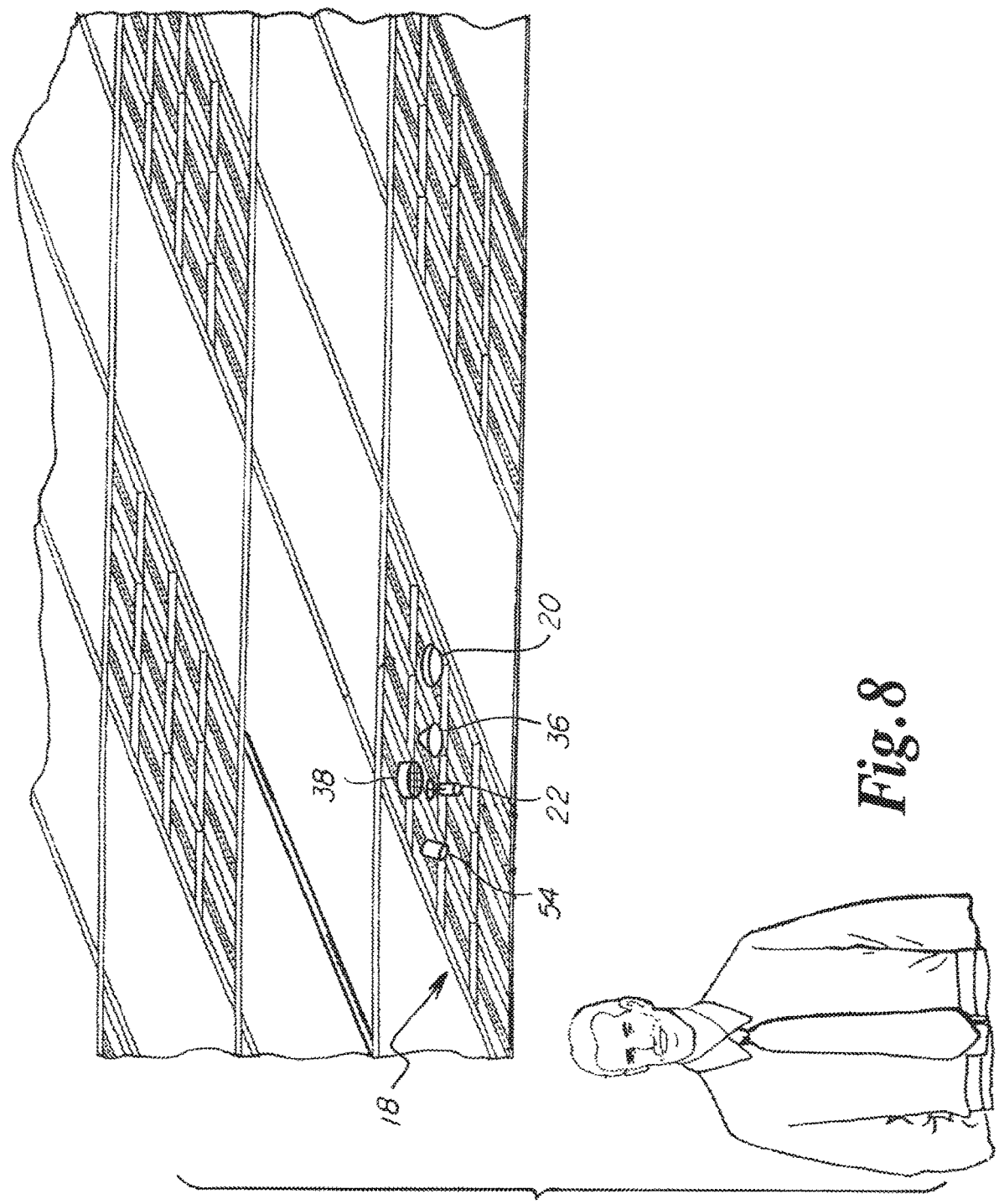
FIG. 8 is a pictorial representation of one embodiment of the invention of an LED light fixture of a visible light embedded communication system including a camera, microphone, and LED light panel.
Figure 9:
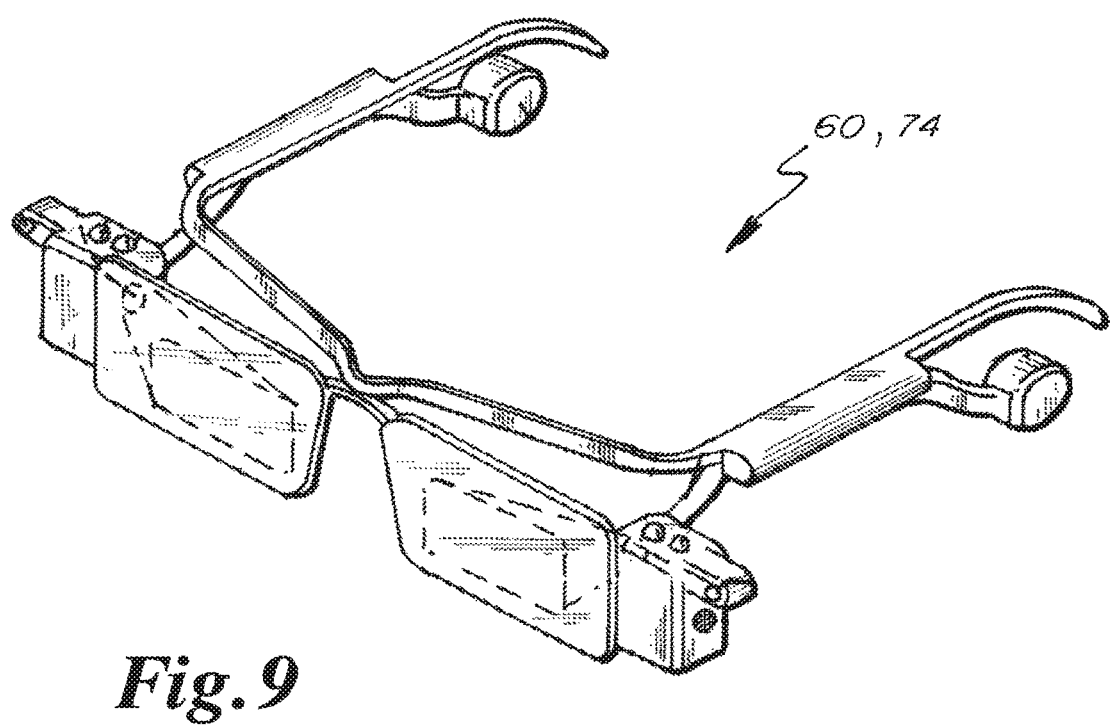
FIG. 9 is an isometric view of one embodiment of an interface for communication with one embodiment of an operating exchange.

In at least one embodiment as may be seen in FIG. 3 an individual is wearing a user interface device 60 such as visible light transceiver glasses 74 and motion sensitive gloves. The individual in FIG. 3 is accessing the operating exchange 44 for a building 12 through the user interface devices 60. In FIG. 4 the individual is moving to enter into a premise site for a virtual cyber office location having LED pulsed light fixtures 18 and visible light embedded communication capabilities. As may be seen in FIG. 5 the individual in the virtual cyber office location is walking down a hallway 46. In FIG. 6 the individual has entered into a virtual office and in FIG. 7 the individual has moved to a virtual light switch and a control element access panel 58 as adjacent to the virtual light switch. As may be seen from FIG. 7 the individual has virtually opened the control element access panel 58 in order to manipulate one of the virtual control elements 62 depicted as a clock or a calendar as earlier described. As depicted in FIGS. 3 through 7, an individual through the user interface devices 60, and the operation exchange 44 for a cyber-location, may in real time alter the status of a remote building function, through a virtual presence and manipulation of a virtual control element 62 as disposed in a control element access panel 58.

Figure 10:
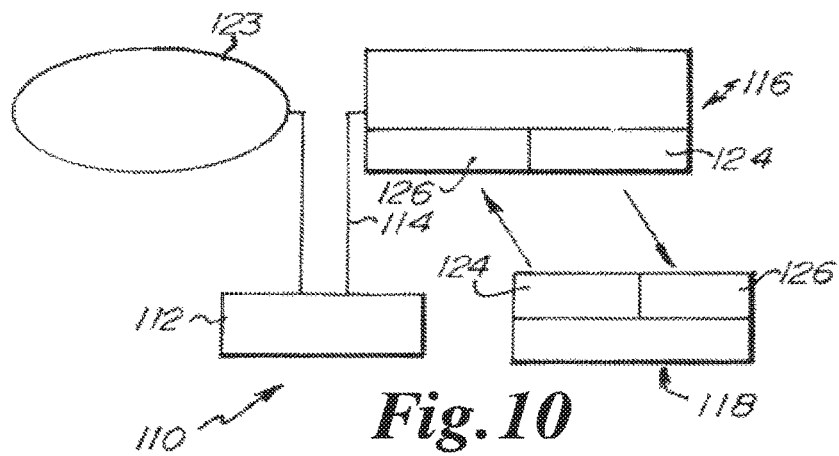
FIG. 10 is a block diagram of one embodiment of a visible light communication system.
Figure 11:
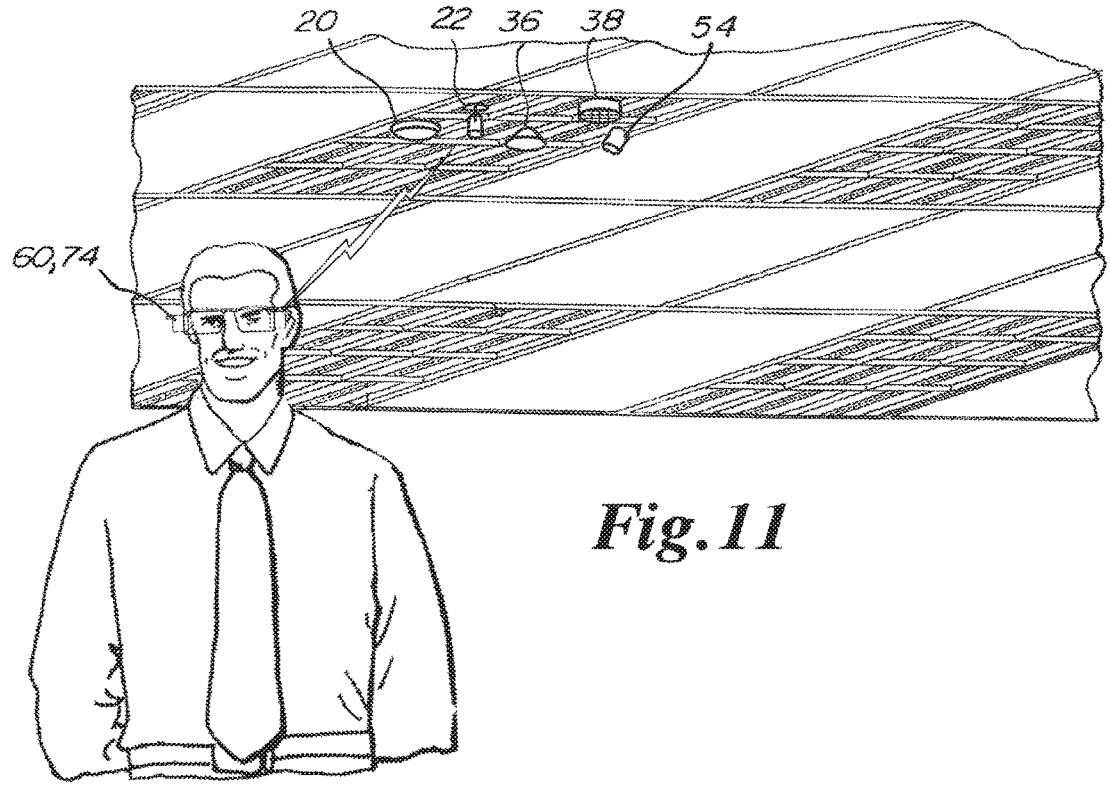
FIG. 11 is a pictorial representation of one embodiment of an interface for an operating exchange in communication with a visible light embedded communication system.

FIG. 10 depicts a block diagram for an embodiment 110 of an LED light and communication system including Visible Light Communication Transceiver Glasses 118. FIG. 10 shows a server PC 112 connected via a USB cable 114 to a server optical transceiver (XCVR) 116, and a set of Visible Light Communication Transceiver Glasses 118 having an optical transceiver. The server PC 112 may be in communication with a network 123 via a CAT-5 cable, for example. An exemplary optical XCVR (or, simply, "XCVR") circuit includes one or more LEDs 124 for transmission of light and one or more photodetectors 126 for receiving transmitted light. The term "photodetector" includes "photodiodes" and all other devices capable of converting light into current or voltage. The terms photodetector and photodiode are used interchangeably herein. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module may drive the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt DC 3 amp power supply is sufficient for powering one or more high intensity LEDs.

In some embodiments, the XCVR circuit further includes an amplifier for amplifying the optical signal received by the photodiodes. The output of the amplifier may be fed into level shifting circuitry to raise the signal to TTL levels, for example. The signal may be fed into the receive pin of the RS232 to USB module.

In some embodiments, a 9V battery can be used to power the amplifier circuitry. Significant noise is generated by switching high brightness LEDs on and off at 200 mA and 500 kbps, for example. Powering the amplifier with a battery may reduce these noise problems by reducing or removing transients.

It should be noted that in some embodiments, the LED can both emit and receive light. In such an embodiment, the LED may act both as a transmitter or receiver. More information on such bi-directional LEDs can be found in U.S. Pat. No. 7,072,587, the entire contents of which are expressly incorporated herein by reference.

Figure 12:
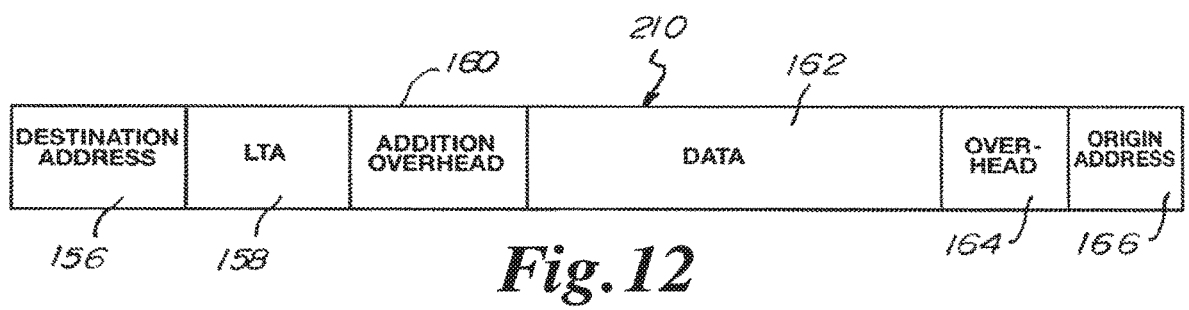
FIG. 12 is a block diagram of one embodiment of a data packet used with a communication within a visible light embedded communication system.
Figure 13:
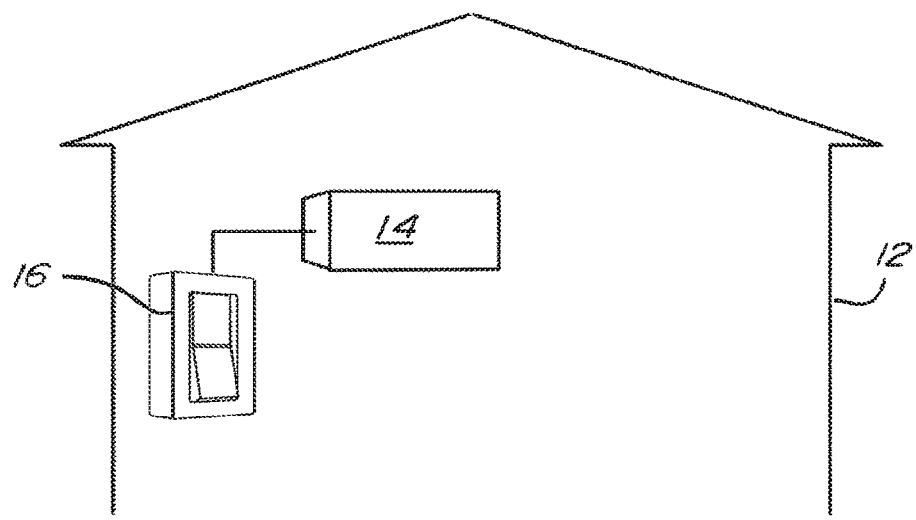
FIG. 13 is a block diagram of one alternative embodiment of the invention.
Figure 14:
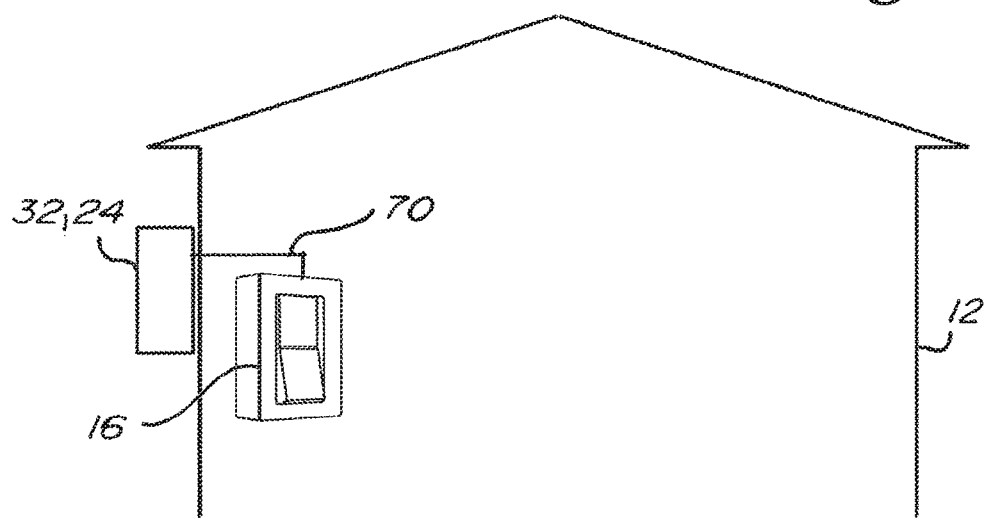
FIG. 14 is a block diagram of one alternative embodiment of the invention.
Figure 15:
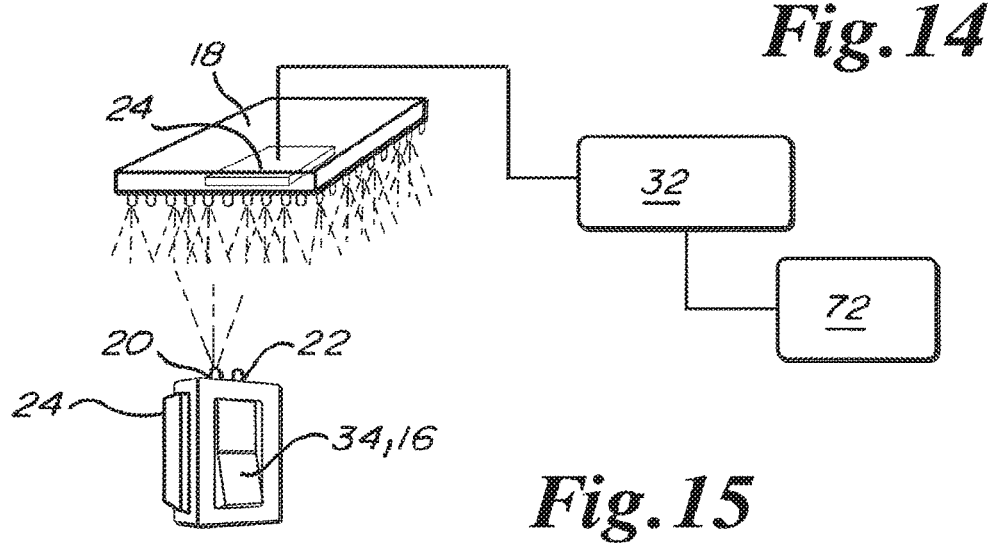
FIG. 15 is a block diagram of one alternative embodiment of the invention.
Figure 16:
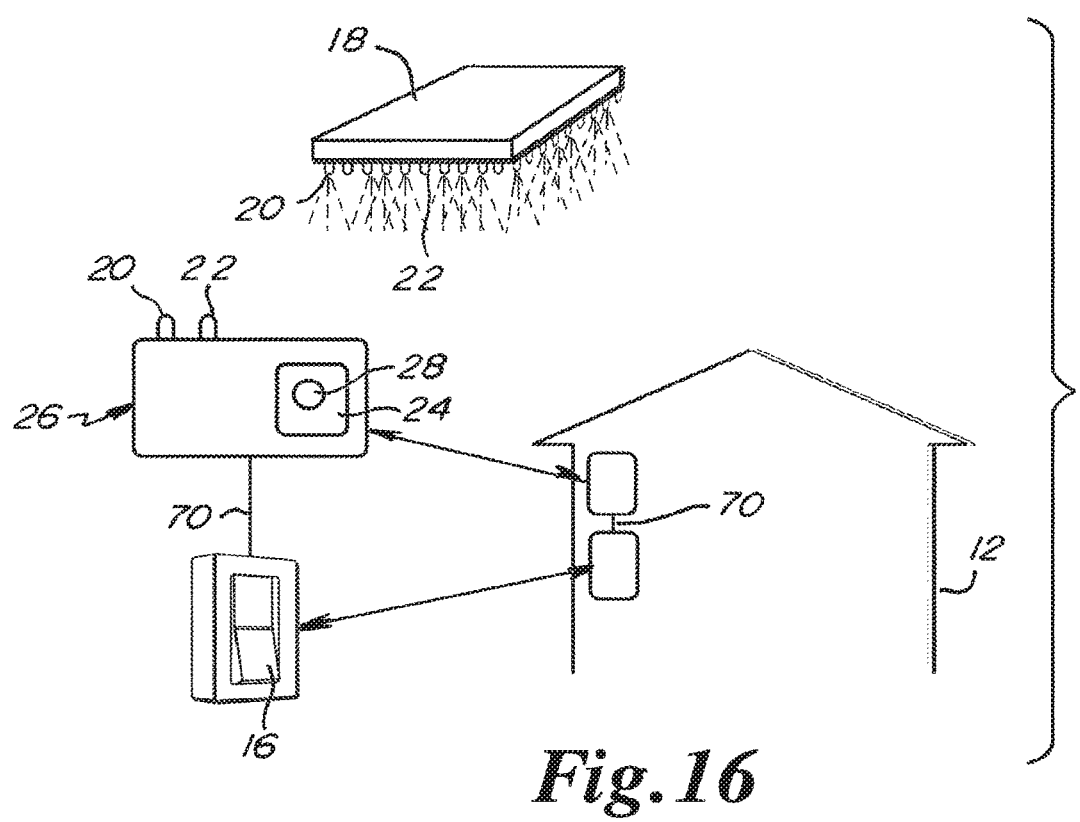
FIG. 16 is a block diagram of one alternative embodiment of the invention.

In some embodiments a data packet 210 may include GPSRS location header bits that include the packet's destination address 156 in GPSRS or other coordinates. The data packet may further include GPSRS location trailer bits that include the packet's origin address 166 in GPSRS coordinates. The data packet may further include the address in GPSRS coordinates of the overhead optical XCVR that most recently transmitted the packet 158 (the last known transmission address, or LTA). The data packet further includes the data 162 to be transmitted, and may include any other bits of information determined to be necessary for successful transmission of data, such as error detection bits. (FIG. 12) Alternatively, another type of identifier may be used such as a MAC address, standard internet protocol identifier or other identifier.

Routing data packets from one location to another location can be accomplished using GPSRS location information tags data packets having a geographic location or a cyber location. Such an embodiment eliminates the need for any later geographic or other location translation because a data packet starts with geographic or other source and destination information. This simplifies locating the destination of the data packet.

In some embodiments, each data packet is assigned a GPSRS origin/destination address or other unique identifier as it passes through the network infrastructure. The data packet is always searching for the next closest GPSRS address location. Each stationary (or static) optical XCVR 116, and some dynamic optical XCVRs, within a network will be designated with a GPSRS location number. As a data packet passes through the network, it is routed by the optical XCVRs, with their internal processors, to the next physically closer optical XCVR within the network. If another optical XCVR is within receiving range, or is connected with another form of communication medium, that optical XCVR receives the data packet. The optical XCVR's internal processor compares its internal GPSRS location address (ILA) to the data packet's GPSRS destination address and the optical XCVR's last known transmission address (LTA) stored within the data packet. If the ILA code is closer to the data packet destination address than the LTA code stored within the data packet, the optical XCVR's processor inserts its ILA code into the data packet as the new LTA code and then repeats transmission of the entire data packet with the updated LTA code.

The network continues this process until the data packet reaches the destination optical XCVR 116 which then transmits the data packet, at which point the data packet is projected or otherwise communicated to an individual. If a piece of the infrastructure is missing, the packet will be rerouted to the next nearest optical XCVR 116 and continue until it finds the shortest pathway through the network to the destination address.

Furthermore, the data may be communicated in a mesh-fashion, where each XCVR lamp directly communicates with adjacent XCVR lamps and does not require central communications or processing. As a result, with little if any infrastructure required, other than visible light encapsulated communication illumination and appropriate processors and programming for each XCVR lamp, signals may be quickly and directly routed from origin to destination.

This means that each user on the network may declare one or more static positions and also may have a dynamic position. A static address may be a home, an office, etc. When a user leaves their static address location to move through the network infrastructure, the user then becomes dynamic. The network may track the user as the user passes optical XCVRs 116, similar to that of cell phones in relation to cell phone towers, and provide a dynamic address location. If a data packet begins with a destination address that is the user's static address, the network may update the packet with the user's new dynamic address and reroute the packet accordingly, in a scheme similar to that of cellular phones.

In some embodiments, the memory of a user's optical XCVR stores the unique code, the static GPSRS location address, or both, of another user's optical XCVR in its "phone book", like a cell phone. In at least one embodiment, a device may include a display, also like a cell phone, that allows a first user to find a second user's information and initiate communication with the second user.

In at least one first alternative embodiment a control device includes a server, the server having an image of an area and an operating exchange, the operating exchange having at least one control element; an interface device is in communication with the operating exchange and at least one control element; and at least one building system, where the at least one building system has at least one control item, the at least one control item being in communication with the operating exchange, wherein at least one command is communicated from the interface device to the operating exchange, and wherein the operating exchange communicates the at least one command to the at least one control item modifying a setting or status for the at least one building system.

In at least one second alternative embodiment according to the first alternative embodiment the interface device is a camera.

In at least one third alternative embodiment according to the first alternative embodiment the interface device is transceiver glasses.

In at least one fourth alternative embodiment according to the first alternative embodiment the interface device includes sensors.

In at least one fifth alternative embodiment according to the first alternative embodiment the image is a three dimensional image.

In at least one sixth alternative embodiment according to the first alternative embodiment the server has recognition software.

In at least one seventh alternative embodiment according to the sixth alternative embodiment the recognition software is selected from the group consisting of gesture-recognition, posture-recognition, eye movement recognition, item recognition, hand movement recognition, facial recognition, voice recognition, motion recognition and head movement recognition software in any combination.

In at least one eighth alternative embodiment according to the first alternative embodiment the control device includes a visible light embedded communication network, the visible light embedded communication network having at least one light emitting diode light fixture having at least one light emitting diode, at least one photodetector, and at least one controller constructed and arranged to provide light in the visible spectrum, the light in the visible spectrum having pulses of light occurring at a frequency which is not detectable by the unaided eyes of an individual, the pulses of light including at least one embedded communication or the command.

In at least one ninth alternative embodiment according to the eighth alternative embodiment the at least one light emitting diode light fixture has at least one microphone and at least one speaker.

In at least one tenth alternative embodiment according to the eighth alternative embodiment the device further includes at least one facility control unit in communication with and disposed between the at least one light emitting diode light fixture and the server.

In at least one eleventh alternative embodiment according to the tenth alternative embodiment the server has at least one unique identifier.

In at least one twelfth alternative embodiment according to the eleventh alternative embodiment the at least one control item has at least one unique identifier.

In at least one thirteenth alternative embodiment according to the twelfth alternative embodiment the at least one light emitting diode light fixture has at least one unique identifier.

In at least one fourteenth alternative embodiment according to the thirteenth alternative embodiment, the at least one light emitting diode and the at least one photodetector each have at least one unique identifier.

In at least one fifteenth alternative embodiment according to the fourteenth alternative embodiment the at least one controller has at least one unique identifier.

In at least one sixteenth alternative embodiment according to the fifteenth alternative embodiment the at least one facility control unit has at least one unique identifier.

In at least one seventeenth alternative embodiment according to the sixteenth alternative embodiment the interface device has at least one unique identifier.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

I claim:

1. A control device comprising:
  a server, said server comprising an operating exchange, said operating exchange comprising a two dimensional or three dimensional image of at least a portion of a building and at least one virtual control element displayed by said operating exchange on said image;
  said building comprising at least one building system, said at least one building system comprising at least one control item, said at least one control item comprising at least one control item identifier, said at least one control item further comprising a control item transceiver, said control item transceiver comprising a control item processor, at least one control item light emitting diode, and at least one control item photodetector;
  said building further comprising a visible light embedded communication system, said visible light embedded communication system comprising a plurality of light emitting diode communication devices, each of said light emitting diode communication devices comprising a processor, a plurality of light emitting diodes, and at least one photodetector, said plurality of light emitting diodes generating light as illumination, said processor being in communication with said plurality of light emitting diodes and said at least one photodetector, said processor being in communication with said server and said processor being constructed and arranged for activation of said plurality of light emitting diodes transmitting at least one command communication signal, and said at least one photodetector being constructed and arranged for receipt of at least one received status communication signal, said at least one transmitted command communication signal being embedded within said illumination and having a wavelength in the visible spectrum, and said at least one received status communication signal being embedded within a light signal having a wavelength in the visible spectrum, each of said at least one transmitted command communication signal and said at least one received status communication signal comprising a plurality of rapid flashes of light, said rapid flashes of light having a frequency which is not observable to an individual, wherein said rapid flashes of light are configured for transmission of at least one of information, instructions and data, each of said plurality of light emitting diode communication devices further comprising at least one internal location identifier, said at least one transmitted command communication signal comprising said at least one control item identifier;
  wherein manipulation of said at least one virtual control element initiates said at least one transmitted command communication signal;
  wherein said at least one control item photodetector receives said at least one transmitted command communication signal from said visible light embedded communication system and said control item processor initiates modification of a setting or a status for said at least one building system; and
  wherein said at least one control item processor activates said at least one control item light emitting diode transmitting said at least one received status communication signal to said visible light embedded communication system, said at least one received status communication signal comprising said at least one internal location identifier.

2. The control device according to claim 1, said control item processor comprising a security protocol.

3. The control device according to claim 2, said at least one transmitted command communication signal comprising said security protocol.

4. The control device according to claim 1, further comprising an interface device in communication with said server.

5. The control device according to claim 4, wherein said interface device is a camera, said camera being constructed and arranged for communication with said visible light embedded communication system.

6. The control device according to claim 4, wherein said interface device comprises transceiver glasses, said transceiver glasses being constructed and arranged for communication with said visible light embedded communication system.

7. The control device according to claim 4, said interface device comprising a unique identifier.

8. The control device according to claim 1, wherein a visible light embedded communication hub is in communication with at least one of said plurality of light emitting diode communication devices and said at least one control item, said visible light embedded communication hub being in communication in series between said at least one light emitting diode communication device and said at least one control item.

9. The control device according to claim 1, said server comprising recognition software.

10. The control device according to claim 9, said recognition software being selected from the group consisting of gesture-recognition, posture-recognition, eye movement recognition, hand movement recognition, facial recognition, voice recognition, motion recognition, image recognition and head movement recognition in any combination.

11. The control device according to claim 1, wherein at least one of said light emitting diode communication devices is a visible light embedded communication light fixture.

12. The control device according to claim 11, said visible light embedded communication light fixture comprising at least one microphone and at least one speaker.

13. The control device according to claim 1, further comprising at least one facility control unit in communication with and disposed between said plurality of light emitting diode communication devices and said server.

14. The control device according to claim 13, said at least one facility control unit comprising a unique identifier.

15. The control device according to claim 1, said server comprising at least one unique identifier.

16. A control device comprising:
  a server, said server comprising an operating exchange, said operating exchange comprising a two dimensional or three dimensional image of at least a portion of a building and at least one virtual control element displayed by said operating exchange on said image;
  said building comprising at least one building system, said at least one building system comprising at least one control item, said at least one control item comprising at least one control item identifier, said at least one control item further comprising a control item processor;
  said building further comprising a visible light embedded communication system, said visible light embedded communication system comprising a plurality of light emitting diode communication devices, each of said light emitting diode communication devices comprising a processor, a plurality of light emitting diodes, and at least one photodetector, said plurality of light emitting diodes generating light as illumination, said processor being in communication with said plurality of light emitting diodes and said at least one photodetector, said processor being in communication with said server and said processor being constructed and arranged for activation of said plurality of light emitting diodes transmitting at least one command communication signal, and said processor being constructed and arranged for receipt of at least one received status communication signal, said at least one transmitted command communication signal being embedded within said illumination and having a wavelength in the visible spectrum, and said processor being constructed and arranged for re-transmission of said at least one received status communication signal, said re-transmission of said at least one received status communication signal being embedded within a light signal having a wavelength in the visible spectrum, each of said at least one transmitted command communication signal and said re-transmission of said at least one received status communication signal comprising a plurality of rapid flashes of light, said rapid flashes of light having a frequency which is not observable to an individual, wherein said rapid flashes of light are configured for transmission of at least one of information, instructions and data, each of said plurality of light emitting diode communication devices further comprising at least one internal location identifier, said at least one transmitted command communication signal comprising said at least one control item identifier;

wherein manipulation of said at least one virtual control element initiates said at least one transmitted command communication signal;

wherein said control item processor receives said at least one transmitted command communication signal and said control item processor initiates modification of a setting or a status for said at least one building system; and wherein said at least one control item processor transmits said at least one received status communication signal, said at least one received status communication signal comprising said at least one internal location identifier.

* * * * *